US011633701B2

(12) United States Patent
Seo et al.

(10) Patent No.: US 11,633,701 B2
(45) Date of Patent: Apr. 25, 2023

(54) FILTER MEDIUM, METHOD FOR MANUFACTURING SAME, AND FILTER UNIT COMPRISING SAME

(71) Applicant: AMOGREENTECH CO., LTD., Gimpo-si (KR)

(72) Inventors: In Yong Seo, Seoul (KR); Ui Young Jeong, Incheon (KR)

(73) Assignee: Amogreentech Co., Ltd., Gyeonggi-do (KR)

( * ) Notice: Subject to any disclaimer, the term of this patent is extended or adjusted under 35 U.S.C. 154(b) by 438 days.

(21) Appl. No.: 16/470,201

(22) PCT Filed: Dec. 14, 2017

(86) PCT No.: PCT/KR2017/014676
§ 371 (c)(1),
(2) Date: Jun. 14, 2019

(87) PCT Pub. No.: WO2018/110986
PCT Pub. Date: Jun. 21, 2018

(65) Prior Publication Data
US 2020/0016545 A1 Jan. 16, 2020

(30) Foreign Application Priority Data
Dec. 15, 2016 (KR) .......... 10-2016-0171438
Dec. 15, 2016 (KR) .......... 10-2016-0171448
(Continued)

(51) Int. Cl.
*B01D 65/08* (2006.01)
*B01D 63/08* (2006.01)
(Continued)

(52) U.S. Cl.
CPC ............ *B01D 65/08* (2013.01); *B01D 63/08* (2013.01); *B01D 65/02* (2013.01);
(Continued)

(58) Field of Classification Search
CPC ........ B01D 63/08; B01D 65/02; B01D 65/08; B01D 67/0002; B01D 67/0088;
(Continued)

(56) References Cited

U.S. PATENT DOCUMENTS 4,073,733 A * 2/1978 Yamauchi .............. B01D 69/02
210/500.27
5,545,323 A * 8/1996 Koehler ................ B01D 29/111
210/493.2
(Continued)

FOREIGN PATENT DOCUMENTS

EP 2803405 A1 11/2014
KR 100201881 B1 6/1999
(Continued)

*Primary Examiner* — Maria V Ewald
*Assistant Examiner* — Ethan Weydemeyer
(74) *Attorney, Agent, or Firm* — Umberg Zipser LLP; Ryan Dean

(57) ABSTRACT

A filter medium according to one embodiment of the present invention comprises: a first support having a plurality of pores; a nanofiber web comprising nanofibers disposed on upper and lower portions of the first support and forming a three-dimensional network structure, and a hydrophilic coating layer formed on at least a part of an outer surface of the nanofibers, wherein the hydrophilic coating layer is formed of a hydrophilic coating composition comprising a hydrophilic polymer compound having at least one functional group selected from a hydroxyl group and a carboxyl group and a crosslinking agent comprising at least one sulfone group; and a second support having a plurality of pores interposed between the first support and the nanofiber web.

14 Claims, 10 Drawing Sheets

(30) Foreign Application Priority Data

Dec. 15, 2016 (KR) .................. 10-2016-0171451
Dec. 15, 2016 (KR) .................. 10-2016-0171452

(51) Int. Cl.

| | | |
|---|---|---|
| *B01D 65/02* | (2006.01) | |
| *B01D 69/06* | (2006.01) | |
| *B01D 67/00* | (2006.01) | |
| *C02F 1/44* | (2023.01) | |
| *B01D 69/02* | (2006.01) | |
| *B32B 5/02* | (2006.01) | |
| *B32B 5/26* | (2006.01) | |
| *B32B 37/18* | (2006.01) | |
| *B32B 37/02* | (2006.01) | |
| *B01D 71/32* | (2006.01) | |

(52) U.S. Cl.
CPC ..... *B01D 67/0002* (2013.01); *B01D 67/0088* (2013.01); *B01D 69/02* (2013.01); *B01D 69/06* (2013.01); *B32B 5/022* (2013.01); *B32B 5/26* (2013.01); *B32B 37/02* (2013.01); *B32B 37/182* (2013.01); *C02F 1/44* (2013.01); *B01D 71/32* (2013.01); *B01D 2321/04* (2013.01); *B01D 2323/02* (2013.01); *B01D 2325/02* (2013.01); *B01D 2325/36* (2013.01); *B32B 2255/02* (2013.01); *B32B 2255/26* (2013.01); *B32B 2262/0238* (2013.01); *B32B 2262/0253* (2013.01); *B32B 2262/12* (2013.01); *B32B 2305/20* (2013.01); *B32B 2307/726* (2013.01); *B32B 2307/728* (2013.01); *B32B 2323/04* (2013.01); *B32B 2323/10* (2013.01); *B32B 2327/12* (2013.01); *B32B 2329/04* (2013.01)

(58) Field of Classification Search
CPC ........ B01D 69/02; B01D 69/06; B32B 5/022; B32B 5/26; B32B 37/02; B32B 7/182; C02F 1/44

See application file for complete search history.

(56) References Cited

U.S. PATENT DOCUMENTS

| | | | |
|---|---|---|---|
| 2007/0271891 A1* | 11/2007 | Chung | .............. D01F 6/90 55/528 |
| 2010/0096317 A1* | 4/2010 | Morita | .............. B01D 63/081 210/321.84 |
| 2014/0014573 A1 | 1/2014 | Hosoya et al. | |
| 2015/0252522 A1 | 9/2015 | Setoguchi et al. | |

FOREIGN PATENT DOCUMENTS

| | | | |
|---|---|---|---|
| KR | 100638322 B1 * | 10/2006 | |
| KR | 100638322 B1 | 10/2006 | |
| KR | 100783784 B1 | 12/2007 | |
| KR | 20100028011 A | 3/2010 | |
| KR | 100982596 B1 | 9/2010 | |
| KR | 20110120202 A | 11/2011 | |
| KR | 20110123909 A | 11/2011 | |
| KR | 101247368 B1 | 4/2013 | |
| KR | 101273346 B1 | 6/2013 | |
| KR | 20130106874 A | 9/2013 | |
| KR | 20150017298 A | 2/2015 | |
| KR | 20150040692 A | 4/2015 | |
| KR | 20150126143 A | 11/2015 | |
| KR | 20160079353 A | 7/2016 | |
| KR | 20160081544 A | 7/2016 | |

* cited by examiner

FILTER MEDIUM, METHOD FOR MANUFACTURING SAME, AND FILTER UNIT COMPRISING SAME

TECHNICAL FIELD

The present invention relates to a filter medium, and more particularly, to a filter medium, a method of manufacturing the same, and a filter unit including the same.

BACKGROUND ART

Separation membranes may be classified, according to pore sizes thereof, into a microfilter (MF) membrane, an ultrafiltration (UF) membrane, a nanofiltration (NF) membrane, and a reverse osmosis (RO) membrane.

Although the above separation membranes have differences in a purpose and a pore size thereof, they are filter media formed of fiber, porous polymer filter media, or have the form of a composite membrane in common.

Meanwhile, some of a variety of foreign substances included in water to be treated may remain in pores of a filter medium on which water treatment is repetitively performed, or an attached layer may be formed on a surface of the filter medium. Here, there is a problem in which foreign substances which remain in the filter medium degrade filtration performance. To solve this, it is common to remove foreign substances which remain in the filter medium by applying a high pressure to the filter medium in a direction opposite to a path through which the water to be treated flows in, is filtered by, and flows out from the filter medium. However, the high pressure applied while the filter medium is cleaned may cause damage of the filter medium, and a problem of delamination may occur in the case of a filter medium having a multilayer structure.

Generally, since most filter medium materials capable of being manufactured by electrospinning are hydrophobic, filter media manufactured using the same have excellent performance in chemical resistance, strength, and the like but have disadvantages such as low filtration performance and severe contamination. To overcome such disadvantages, enhancing hydrophilicity of a filter medium manufactured using a hydrophobic polymer has been attempted using a variety of methods.

Representatively, there is a method of adsorbing water-soluble polymer materials onto a surface of a filter medium. In this case, there is a problem in which when a water-soluble polymer comes into contact with water, the polymer is easily detached from the hydrophobic filter medium such that hydrophilicity thereof is divested. Also, since a hydrophilic polymer is generally modified into the form of a film only on a surface layer of the filter medium, a grafting percent is low.

Also, there is a method of mixing and emitting fiber forming components for manufacturing a filter medium with hydrophilic polymer materials. In this case, it is very difficult to adjust solubility and a residual state of the hydrophilic polymer materials such that filtration properties change or the hydrophilic polymer materials are gradually eluted as time passes.

Accordingly, it is urgent to develop a filter medium capable of minimizing deformation and damage to a shape and a structure of the medium in a backwashing process performed at high pressure simultaneously while easily securing a flow path so as to have a high flow rate and a quick water-treatment speed, to easily control contamination through a balance between hydrophilicity and hydrophobicity, to have excellent filtration performance with respect to contaminants having positive ions such as a cationic compound and the like, and to improve water permeability and chemical resistance.

DISCLOSURE

Technical Problem

The present invention is directed to providing a filter medium which is uniformly coated with hydrophilic components such that water permeability and chemical resistance are improved, contaminants are easily controlled, filtration performance with respect to contaminants having positive ions such as a cationic compound and the like is excellent, and a method of manufacturing the same.

The present invention is also directed to providing a filter medium having excellent antibacterial and disinfection properties and a method of manufacturing the same.

The present invention is also directed to providing a filter medium which is uniformly coated with a cationic coating layer so as to have improved filtration performance with respect to contaminants having negative ions such as microbes, an anionic compound, viruses, and the like, and a method of manufacturing the same.

The present invention is directed to provide a filter medium in which nanoparticles are uniformly dispersed in fiber such that an interface capable of coming into direct contact with contaminants is formed to have an excellent antibacterial effect, and a method of manufacturing the same.

The present invention is also directed to providing a filter medium in which deformation and damage to a shape and a structure of the filter medium in a water treatment operation is minimized simultaneously while a flow path is easily secured so as to have a high flow rate and a quick treatment speed, and a method of manufacturing the same.

The present invention is also directed to providing a filter medium in which a flow path can be secured at high pressure applied, and delamination, damage to a membrane, and the like can be minimized, and durability is high in a backwashing process, and a method of manufacturing the same.

The present invention is also directed to providing a flat filter unit and a filter module which are variously applicable to a water treatment field using a filter medium having excellent water permeability and durability.

Technical Solution

A first embodiment of the present invention is directed to provide a filter medium including a first support having a plurality of pores, nanofiber webs disposed above and below the first support and including nanofibers forming a three-dimensional network structure and a hydrophilic coating layer formed on at least a part of an outer surface of the nanofibers and formed of a hydrophilic coating composition including a hydrophilic polymer compound including one or more types of functional groups selected from a hydroxyl group and a carboxyl group and a crosslinking agent including one or more sulfonic groups, and second supports interposed between the first support and the nanofiber webs and having a plurality of pores.

The hydrophilic polymer compound may be polyvinyl alcohol having a degree of polymerization in a range of 500 to 2,000 and a degree of saponification in a range of 85 to 90%.

The crosslinking agent may include sulfosuccinic acid and poly(styrene sulfonic acid-maleic acid) at a weight ratio of 1:3 to 1:10.

The hydrophilic coating layer may be formed by crosslinking the hydrophilic polymer compound using the crosslinking agent.

The hydrophilic coating composition may include 80 to 150 parts by weight of the crosslinking agent with respect to 100 parts by weight of the hydrophilic polymer compound.

The hydrophilic coating composition may include 1,000 to 20,000 parts by weight of a wettability enhancer with respect to 100 parts by weight of the hydrophilic polymer compound.

The wettability enhancer may be isopropyl alcohol.

The hydrophilic coating layer may have a thickness of 5 to 20% in comparison to an average diameter of the nanofibers.

The nanofiber web may have an average pore diameter of 0.1 to 3 μm and a porosity of 40 to 90%.

The nanofibers may have an average diameter of 50 to 450 nm.

The first support and the second supports may be any one of a non-woven fabric, a woven fabric, and a knitted fabric.

The first support may include a first composite fiber which includes a support component and a low melting point component and is disposed to expose at least a part of the low melting point component on an outer surface, and the first support and the second supports may be bonded through fusion between the low melting point component of the first composite fiber and a low melting point component of a second composite fiber.

The first support may have a thickness of 90% or more of a thickness of an entirety of the filter medium and may have a basis weight of 250 to 800 $g/m^2$.

The second support may include a second composite fiber which includes a support component and a low melting point component and is disposed to expose at least a part of the low melting point component on an outer surface, and the low melting point component of the second composite fiber may be fused onto the nanofiber web.

The second support may have a basis weight of 35 to 80 $g/m^2$ and a thickness of 150 to 250 μm.

Another aspect of the present invention provides a method of manufacturing a filter medium. The method includes (1) forming a fiber web using nanofibers formed by electrospinning a spinning solution, (2) manufacturing lamination by laminating the fiber web with a second support, (3) forming a hydrophilic coating layer using a hydrophilic coating composition including a hydrophilic polymer compound including one or more types of functional groups selected from a hydroxyl group and a carboxyl group on at least a part of an outer surface of the nanofibers of the fiber web included in the lamination and a crosslinking agent including at least one sulfonic group, and (4) disposing and laminating the lamination including the hydrophilic coating layer on each of both sides of a first support such that the second support comes into contact with the first support.

The operation (3) may include (3-1) forming the hydrophilic coating layer on the lamination by treating the hydrophilic coating composition and (3-2) removing the hydrophilic coating layer formed on the second support by cleaning the lamination on which the hydrophilic coating layer is formed.

A second embodiment of the present invention provides a filter medium including a first support having a plurality of pores, nanofiber webs disposed above and below the first support and including nanofibers forming a three-dimensional network structure and a silver antibacterial layer formed on at least a part of an outer surface of the nanofibers, and second supports interposed between the first support and the nanofiber webs and having a plurality of pores.

The silver antibacterial layer may be formed through vapor deposition to cover a part of the outer surface of the nanofibers or formed through plating to cover an entirety of the outer surface.

The silver antibacterial layer may have an average thickness of 5 to 120 nm. A weight of the silver antibacterial layer may be 30 to 500% in comparison to a weight of the entirety of the nanofibers.

The nanofiber web may have an average pore diameter of 0.1 to 3 μm and a porosity of 50 to 90%.

The present invention provides a method of manufacturing a filter medium. The method includes (1) forming a fiber web using nanofibers formed by electrospinning a spinning solution, (2) manufacturing a nanofiber web by providing a silver antibacterial layer on at least a part of an outer surface of the nanofibers, (3) laminating the nanofiber web with a second support, and (4) laminating the nanofiber web and the second support, which are laminated, on each of both sides of a first support such that the second support comes into contact with the first support.

The operation (2) may be performed using an electroless plating method.

The method may further include, before the operation (2), an operation of pretreating a surface of the nanofibers to improve adhesion of silver with respect to the nanofibers.

The pretreatment operation may be a catalyst-treatment operation or a nanofiber etching operation.

The operation (2) may be any one selected from the group consisting of sputtering, ion plating, arc deposition, ion beam assisted deposition, and resistance heating vacuum evaporation.

The method may further include, before the operation (2), cleaning the nanofiber web and forming a nonvolatile primer layer having polarity on a surface of the cleaned nanofiber web.

A third embodiment of the present invention provides a filter medium including a first support having a plurality of pores, nanofiber webs disposed above and below the first support and including nanofibers forming a three-dimensional network structure and a positively charged coating layer formed on at least a part of an outer surface of the nanofibers, and second supports interposed between the first support and the nanofiber webs and having a plurality of pores.

The positively charged coating layer may include one or more types of metal complexing compounds selected from the group consisting of silver, copper, zinc, cadmium, mercury, antimony, gold, platinum, palladium, and a mixture thereof.

The positively charged coating layer may include one or more types of compounds selected from the group consisting of aluminate, aluminum alkoxide, cationic silica, polyethyleneimine, melamine-formaldehyde, polyamine-epichlorohydrin, and aliphatic polyamine.

The aluminate may include one or more types of compounds selected from the group consisting of aluminum sulfate, sodium aluminate, aluminum chloride, aluminum nitrate, and aluminum hydroxide. The aluminum alkoxide may include one or more types of compounds selected from the group consisting of aluminum isopropoxide, aluminum ethoxide, and aluminum t-butoxide.

The positively charged coating layer may have a thickness of 5 to 20% in comparison to an average diameter of the nanofibers.

The positively charged coating layer may be formed by curing a coating composition including a solvent, a positively charged compound, and a binder, and the positively charged coating layer may include the positively charged compound and the cured binder at a weight ratio of 1:0.03 to 1:1.7.

The filter medium may further include a hydrophilic coating layer interposed between the positively charged coating layer and the outer surface of the nanofibers and having a thickness of 5 to 20% of an average diameter of the nanofibers.

The positively charged coating layer may be formed by vapor-depositing the positively charged compound on a part of the outer surface of the nanofibers or formed by plating an entirety of the outer surface with the positively charged compound.

Yet another aspect of the present invention provides a method of manufacturing a filter medium. The method includes (1) forming a fiber web using nanofibers formed by electrospinning a spinning solution, (2) manufacturing a nanofiber web by providing a positively charged coating layer including a positively charged compound on at least a part of an outer surface of the nanofibers, (3) laminating the nanofiber web with a second support, and (4) laminating the nanofiber web and the second support, which are laminated, on each of both sides of a first support such that the second support comes into contact with the first support.

The operation (2) may include (2-1) preparing a positively charged coating composition including a solvent, a positively charged compound, and a binder and (2-2) manufacturing the nanofiber web including the positively charged coating layer by treating the fiber web with the positively charged coating composition.

The method may further include forming a hydrophilic coating layer between the operations (1) and (2).

In the operation (2), the positively charged coating layer may be formed by performing any one selected from the group consisting of sputtering, ion plating, arc deposition, ion beam assisted deposition, and resistance heating vacuum evaporation on the positively charged compound.

A fourth embodiment of the present invention provides a filter medium including nanofiber webs having a three-dimensional network structure having a plurality of pores and formed by laminating nanofibers including silver nanoparticles, and porous second supports interposed between the first support and the nanofiber webs.

An average particle size of the silver nanoparticles may be 10 to 500 nm.

A weight of the silver nanoparticles may be 1 to 3% of an overall weight.

Even another aspect of the present invention provides a method of manufacturing a filter medium. The method includes (1) laminating a nanofiber web including silver nanofibers with a second support and (2) disposing and laminating the nanofiber web and the second support, which are laminated, on each of both sides of a first support such that the second support comes into contact with the first support. Here, a thickness of the first support is 90% or more of a thickness of an entirety of the filter medium.

The operation (1) may include (1-1) forming the nanofiber web by electrospinning a spinning solution, in which silver salts dissolve, on the second support and (1-2) laminating the nanofiber web with the second support by applying heat and pressure to both sides of the second support on which the nanofiber web is formed.

The silver salts may be one of silver nitrate, silver sulfate, and silver chloride.

A further aspect of the present invention provides a flat filter unit including the above-described filter medium according to the present invention and a support frame including a flow path, through which a filtrate filtered by the filter medium is discharged to the outside, and supporting an edge of the filter medium.

Advantageous Effects

According to the present invention, in a filter medium, deformation and damage to a shape and a structure of the filter medium may be minimized and a flow path may be easily secured so as to have a high flow rate in a water treatment operation. Also, despite high pressure applied in backwashing, an extended use period is provided due to excellent durability of the filter medium, excellent water permeability and chemical resistance are provided by uniformly coating a surface thereof with hydrophilic components, contamination is easily controlled, and filtration performance with respect to contaminants having positive ions such as a cationic compound and the like is excellent such that the filter medium is variously applicable to a variety of water treatment fields. Also, a nanofiber web includes silver such that an excellent antibacterial effect capable of disinfecting a variety of bacteria included in water to be treated may be provided. Also, due to excellent electrochemical adsorption performance, excellent filtration efficiency with respect to contaminants such as microbes, cationic compounds, viruses, and the like may be provided.

DESCRIPTION OF DRAWINGS

FIGS. 2A and 2B are schematic diagrams illustrating adsorption with respect to contaminants such as a cationic compound and the like;

FIGS. 3A and 3B are schematic diagrams illustrating adsorption with respect to contaminants such as an anionic compound, viruses, and the like;

FIG. 4 is a schematic diagram illustrating lamination of the filter medium according to one embodiment of the present invention in which

FIG. 5 is a view illustrating a flat filter unit according to one embodiment of the present invention in which

BEST MODES

Figure 1:
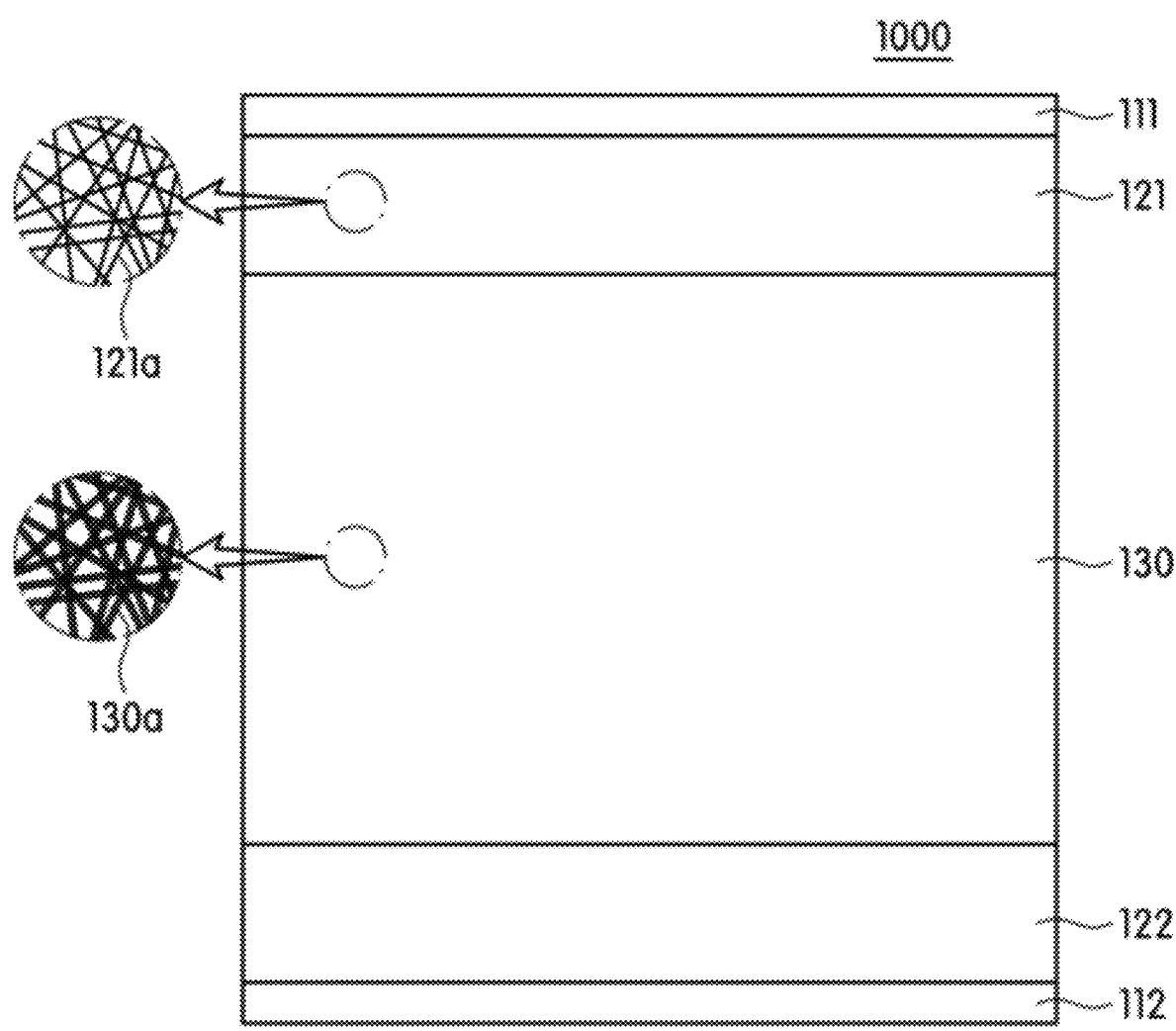
FIG. 1 is a cross-sectional view of a filter medium according to one embodiment of the present invention.

Hereinafter, embodiments of the present invention will be described in detail with reference to the attached drawings to allow one of ordinary skill in the art to easily carry out the present invention. The present invention may be embodied in a variety of different shapes and is not limited to the embodiments disclosed herein. In order to clearly describe the present invention, parts irrelevant to the present invention are omitted, and the same or similar components are referred to as equal reference numerals.

A filter medium 1000 according to a first embodiment of the present invention includes, as shown in FIG. 1, a first support 130 including a plurality of pores, nanofiber webs 111 and 112 disposed above and below the first support 130, and nanofibers forming a three-dimensional network structure and a hydrophilic coating layer formed using a hydrophilic coating composition including a hydrophilic polymer compound including one or more functional groups selected from a hydroxyl group and a carboxyl group and a crosslinking agent including at least one sulfonic group on at least a part of an outer surface of the nanofibers, and second supports 121 and 122 including a plurality of pores and interposed between the first support 130 and the nanofiber webs 111 and 112, respectively.

In general, a filter medium formed only of nanofibers having hydrophobicity has excellent chemical resistance. However, the filter medium is applied to a water treatment filter field, and due to the hydrophobicity of the filter medium, water affinity is decreased such that water permeability is degraded. Here, although water permeability of the hydrophobic filter medium may be improved using adequate pressure, since necessary pressure is very high (150 to 300 psi), the filter medium may be damaged. Also, the filter medium is vulnerable to contaminants having hydrophobicity and contaminants having positive ions such that a study for treatment of providing a filter medium with hydrophilicity and negative ions is required.

Thus, the present invention may solve the above-described problems by embodying the nanofiber webs 111 and 112 including the hydrophilic coating layer formed on at least the part of the outer surface of the nanofibers.

Figure 2A:
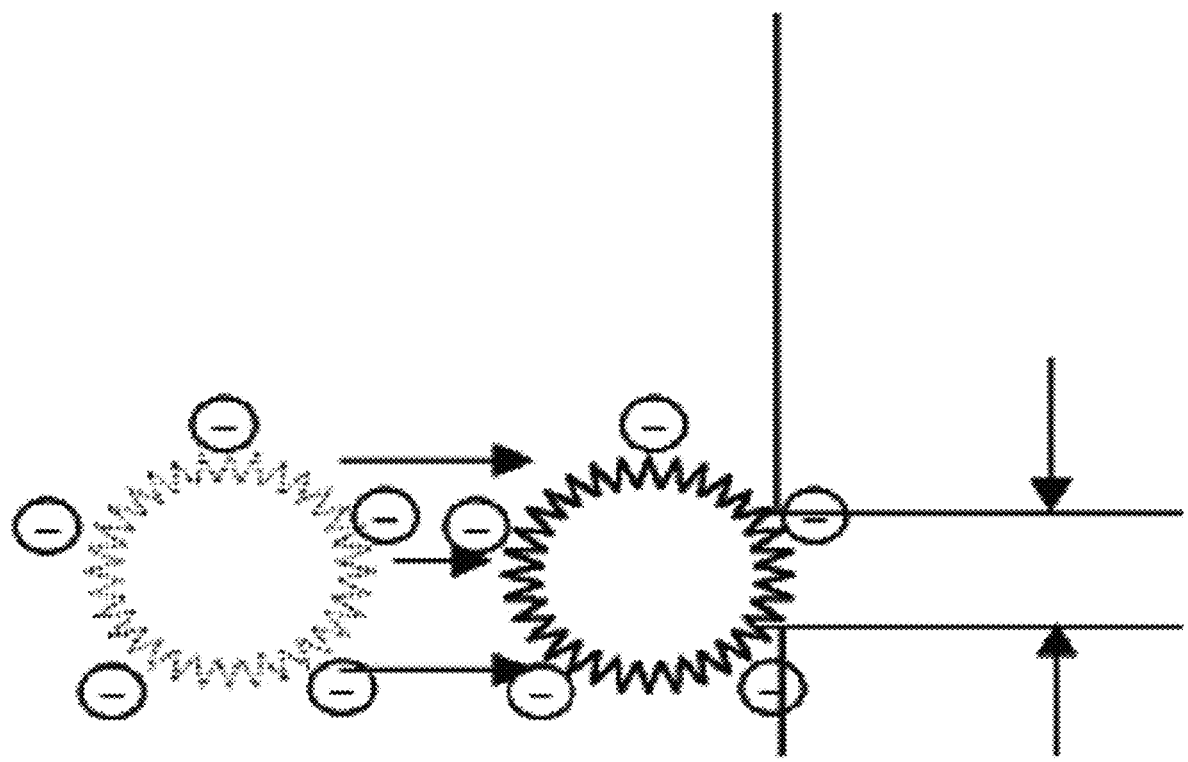
Figure 2B:
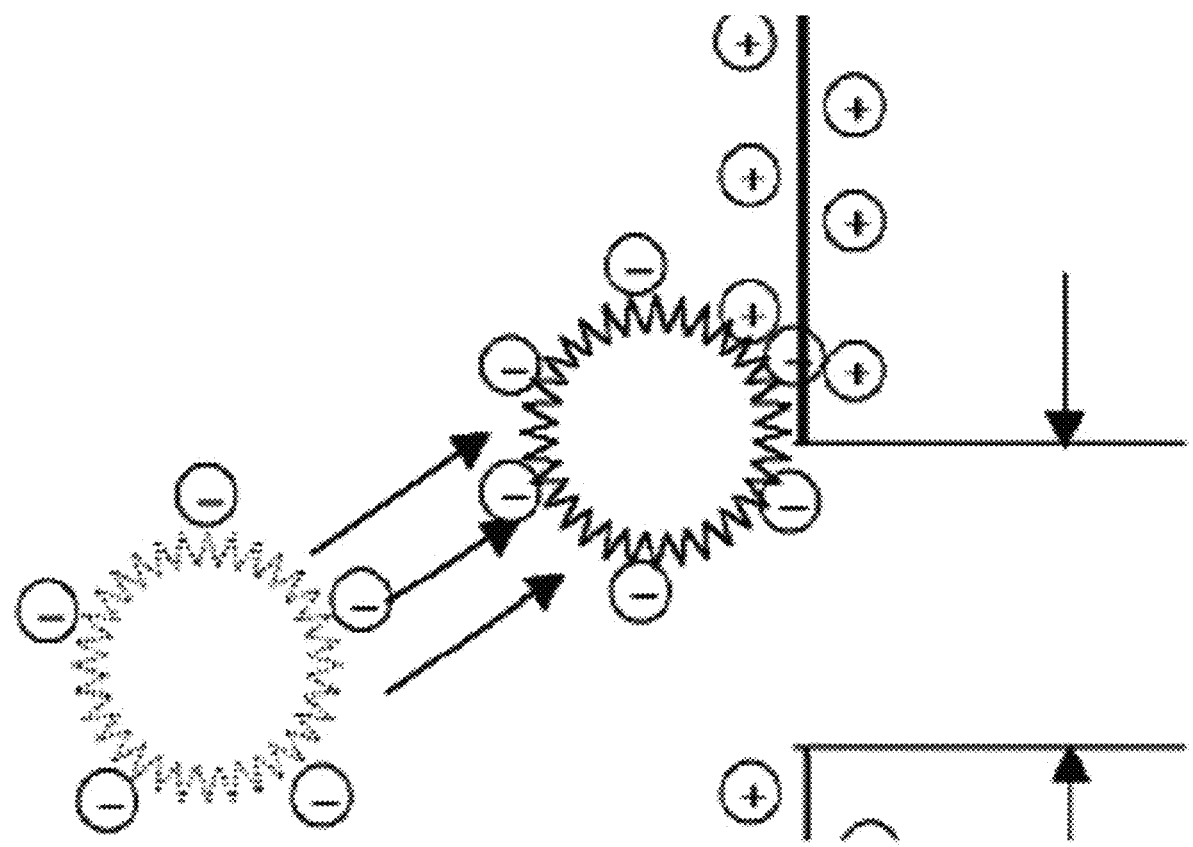

That is, referring to FIGS. 1, 2A, and 2B, the filter medium 1000 according to the present invention includes the second supports 121 and 122 and the nanofiber webs 111 and 112 sequentially laminated above and below the first support 130 and has a filtration flow in which a filtrate filtered by the nanofiber webs 111 and 112 flows toward the first support 130. Here, contaminants such as a cationic compound and the like, which pass through the nanofiber webs 111 and 112, may be effectively filtered out as shown in FIGS. 2A and 2B.

In more detail, general micro-contaminants having positive ions may be electrochemically adsorbed with negative charges of the hydrophilic coating layer on a surface of a plurality of nanofibers forming the nanofiber webs due to electrostatic attraction. That is, the hydrophilic coating layer may be formed as a polymer in which negatively charged atoms included therein are straightly chained or branched such that contaminants having positive ions, which are included in a solution to be filtered, may be adsorbed onto the hydrophilic coating layer due to electrostatic attraction and be induced to be precipitated on the surface of the nanofiber web to be filtered out. Here, removal performance with respect to contaminants having positive ions may vary according to charge density of negative charges, and the charge density may be adequately selected in consideration of a type and charge density of target contaminants.

The hydrophilic coating layer is formed using a hydrophilic coating composition including a hydrophilic polymer compound including one or more types of functional groups selected from a hydroxyl group and a carboxyl group and a crosslinking agent including at least one sulfonic group.

As the hydrophilic polymer compound, any hydrophilic polymer compounds including one or more types of functional groups selected from a hydroxyl group and a carboxyl group, which are conventionally usable, may be used without limitation, and more preferably, may be one of polyvinyl alcohol (PVA), ethylene vinyl alcohol (EVOH), sodium alginate, and the like, and a mixture thereof. As an example, PVA may be used.

When the hydrophilic polymer compound is PVA, the PVA may have a degree of polymerization of 500 to 2000, and more preferably, 1500 to 2000 and a degree of saponification of 85 to 90%, and more preferably, 86 to 89%. As an example, the PVA may have a degree of polymerization of 1800 and a degree of saponification of 88%. When the degree of polymerization of the PVA is less than 500, the hydrophilic coating layer may not be easily formed or may be easily taken off even when being formed. Also, a hydrophilic degree may not be improved to a target level. When the degree of polymerization exceeds 2000, the hydrophilic coating layer may be excessively formed. Accordingly, a pore structure of a fiber web layer may be changed or pores are blocked such that porosity and a pore diameter may be degraded. Also, when the degree of saponification of the PVA is less than 85%, forming of the hydrophilic coating layer may be unstable and a degree of improvement of hydrophilicity may be insignificant. When the degree of saponification exceeds 90%, due to a strong hydrogen bond between PVA molecules, the PVA may not be easily dissolved in a solvent at high temperature. Even when the PVA is dissolved, complete dissolution is difficult such that it may be difficult to prepare a solution for forming the hydrophilic coating layer. Accordingly, the hydrophilic coating layer may not be adequately formed. Even when being formed, the hydrophilic coating layer may be non-uniformly formed and some pores may be blocked such that objective effects may not be provided.

As the crosslinking agent, any generally usable crosslinking agents including at least one sulfonic group may be used without limitation, and preferably, one or more types selected from the group consisting of sulfosuccinic acid and poly(styrene sulfonic acid-maleic acid) may be used. As an example, the crosslinking agent may include both sulfosuccinic acid and poly(styrene sulfonic acid-maleic acid).

The hydrophilic coating layer is formed by being crosslinked with the hydrophilic polymer composition using the crosslinking agent such that hydrophilicity of the filter medium is improved simultaneously while the hydrophilic coating layer is negatively charged such that filtration efficiency with respect to cationic contaminants may be improved.

When the crosslinking agent includes both sulfosuccinic acid and poly(styrene sulfonic acid-maleic acid), the crosslinking agent may include sulfosuccinic acid and poly (styrene sulfonic acid-maleic acid) at a weight ratio in a range of 1:3 to 1:10, and preferably, at a weight ratio in a range of 1:5 to 1:8. As an example, the weight ratio between sulfosuccinic acid and poly(styrene sulfonic acid-maleic acid) may be 1:6.7. When the weight ratio between sulfosuccinic acid and poly(styrene sulfonic acid-maleic acid) is less than 1:3, a rate of being crosslinked with PVA is lacking such as to degrade forming of the hydrophilic coating layer. When the weight ratio between sulfosuccinic acid and poly(styrene sulfonic acid-maleic acid) exceeds 1:10, a crosslinked bond and water permeability may be degraded due to an autoagglutination phenomenon.

Also, 80 to 150 parts by weight, and preferably, 90 to 140 parts by weight of the crosslinking agent may be included with respect to 100 parts by weight of the hydrophilic polymer compound. As an example, 115 parts by weight of the crosslinking agent may be included with respect to 100 parts by weight of the hydrophilic polymer compound. When the crosslinking agent is less than 80 parts by weight with respect to 100 parts by weight of the hydrophilic polymer compound, formability of the hydrophilic coating layer may be degraded and chemical resistance and mechanical strength may be degraded. When 150 parts by weight is exceeded, the crosslinking agent may clump in a hydrophilic coating composition such that it is difficult for a crosslinking reaction to be uniformly performed. Accordingly, the coating layer may be non-uniformly formed or pores may be reduced due to the coating layer such that a flow rate may be decreased.

Meanwhile, due to strong hydrophobicity of nanofibers forming a manufactured fiber web layer, even when the above-described hydrophilic coating composition is treated, the coating composition may not penetrate into the fiber web layer such that it is difficult for the hydrophilic coating composition to reach the nanofibers in the fiber web layer which flow along a surface. Also, although the hydrophilic coating composition reaches the inside, the hydrophilic coating layer may not be adequately formed on an outer surface of the nanofibers. Accordingly, the hydrophilic coating composition may further include a wettability enhancer such that penetrability of the hydrophilic coating composition into the fiber web layer is improved, the penetrating hydrophilic coating composition well permeates the outer surface of the nanofibers, and the hydrophilic coating composition is quickly dried to coat the nanofibers before flowing down.

As the wettability enhancer, any one of components which can improve wettability of the outer surface of the hydrophobic nanofibers with respect to a hydrophilic solution and are easily vaporizable and soluble in the hydrophilic coating composition may be used without limitation. As an example, the wettability enhancer may be one or more types of components selected from the group consisting of isopropyl alcohol, ethyl alcohol, and methyl alcohol, and preferably, isopropyl alcohol may be used to prevent a fiber web from contracting due to vaporization of the wettability enhancer and prevent a change in a pore structure of the initially designed fiber web which is caused by the contraction. Also, 1,000 to 20,000 parts by weight, and preferably, 5,000 to 15,000 parts by weight of the wettability enhancer may be included with respect to 100 parts by weight of polyvinyl alcohol included in the hydrophilic coating composition. As an example, 5,000 parts by weight of the wettability enhancer may be included with respect to 100 parts by weight of polyvinyl alcohol. When the wettability enhancer is provided at less than 1,000 parts by weight, improvement in wettability of the nanofibers is insignificant such that the hydrophilic coating layer may not be easily formed and the hydrophilic coating layer may be frequently delaminated. Also, when the wettability enhancer is provided at more than 20,000 parts by weight, improvement in the wettability may be insignificant and concentrations of polyvinyl alcohol and the crosslinking agent included in the hydrophilic coating composition are decreased such that the hydrophilic coating layer may not be easily formed.

Meanwhile, when the nanofibers are coated with the hydrophilic coating layer of a certain thickness or more, since an average pore diameter and/or porosity of the nanofiber webs may decrease due to the coated nanofibers, water permeability and filtration efficiency may be degraded. When being coated less than the certain thickness, since the filtration efficiency may be significantly degraded, the hydrophilic coating layer may be formed within a thickness range. Accordingly, the hydrophilic coating layer according to the present invention may be formed to have a thickness of 5 to 20%, and preferably, 8 to 18% in comparison with an average diameter of the nanofibers. As an example, the hydrophilic coating layer may be formed to have a thickness of 12% in comparison with the average diameter of the nanofibers. When the hydrophilic coating layer is formed to have a thickness of less than 5% in comparison with the average diameter of the nanofibers, since the hydrophilic coating layer is delaminated during a backwashing process in which an excessive pressure is applied, filtration efficiency may not be provided at a target level. When the hydrophilic coating layer is formed to have a thickness of more than 20%, it is not easy to decrease a weight of the filter medium. Also, as a size and porosity of pores are reduced, water permeability of the solution to be filtered may be degraded.

Next, the nanofibers forming the nanofiber webs 111 and 112 may be formed of a well-known fiber-forming component. However, preferably, a fluorine-based compound may be included as the fiber-forming component to provide excellent chemical resistance and heat resistance. Through this, even through the filtrate is a strong acid/strong alkali solution or a high-temperature solution, filtration efficiency/flow rate at a target level and a long use period may be provided without change in properties of the filter medium. The fluorine-based compound may be any one of well-known fluorine-based compounds which may manufactured using nanofibers without limitation, and for example, may include one or more compounds selected from the group consisting of polytetrafluoroethylene (PTFE), a tetrafluoroethylene-perfluoroalkyl vinyl ether (PFA) copolymer, a tetrafluoroethylene-hexafluoropropylene (FEP) copolymer, a tetrafluoroethylene-hexafluoropropylene-perfluoroalkyl vinyl ether (EPE) copolymer, a tetrafluoroethylene-ethylene (ETFE) copolymer, polychlorotrifluoroethylene (PCTFE), a chlorotrifluoroethylene-ethylene (ECTFE) copolymer, and poly(vinylidene fluoride) (PVDF). More preferably, due to a low manufacturing cost, nanofibers being easy to mass produce through electrospinning, and excellent mechanical strength and chemical resistance, the fluorine-based compound may be PVDF. Here, when the nanofibers include PVDF as a fiber-forming component, a weight average molecular weight of the PVDF may be 10,000 to 1,000,000, and preferably, 300,000 to 600,000, but the PVDF is not limited thereto.

Also, an average diameter of the nanofibers may be 50 to 450 nm, and preferably, 100 to 400 nm. As an example, the average diameter of the nanofibers may be 250 µm. A thickness of the nanofiber webs 111 and 112 may be 0.5 to 200 µm, and for example, may be 20 µm. A basis weight thereof may be 0.05 to 20 g/m$^2$, and for example, may be 10 g/m$^2$ but may be changed adequately in consideration of target water permeability and filtration efficiency and is not particularly limited in the present invention.

Also, an average pore diameter of the nanofiber webs 111 and 112 may be 0.1 to 3 µm, and preferably, 0.15 to 2 µm, and for example, may be 0.25 µm. When the average pore diameter of the nanofiber webs 111 and 112 is less than 0.1 µm, water permeability with respect to a solution to be filtered may be degraded. When the average diameter exceeds 3 µm, filtration efficiency may not be high with respect to contaminants.

Also, porosity of the nanofiber webs 111 and 112 may be 40 to 90%, and preferably, 45 to 80%. For example, the porosity of the nanofiber webs 111 and 112 may be 45%. When the porosity of the nanofiber webs 111 and 112 is less than 40%, water permeability with respect to a solution to be filtered may be degraded. When the porosity exceeds 90%, filtration efficiency of the filter medium with respect to contaminants may not be high.

Also, one or more layers of the nanofiber webs 111 and 112 may be included in the filter medium 1000. Here, porosity, an pore diameter, a basis weight, a thickness, and/or the like of each nanofiber web may be different.

Hereinafter, other components included in the filter medium 1000 will be described in detail.

First, the first support 130 supports the filter medium 1000 and forms a large flow path to more smoothly perform a filtration process or a backwashing process. In detail, when a pressure difference (gradient) is formed such that an internal pressure of the filter medium is lower than an external pressure thereof during the filtration process, the filter medium may be compressed. In this case, a flow path through which the filtrate may flow in the filter medium may be significantly reduced or blocked such that a higher differential pressure is applied to the filter medium simultaneously while a flow rate may be significantly degraded. Also, an external force for expansion may be applied from the inside of the filter medium toward the outside in both directions during the backwashing process. When a mechanical strength is low, the filter medium may be damaged by the applied external force.

The first support 130 may be provided to prevent the above problems which occur during the filtration process and/or the backwashing process, may be used in a water treatment field, and may be a well-known porous member which secures mechanical strength. For example, the first support may be non-woven fabric, fabric, or knitted fabric.

The woven fabric refers to fabric including fibers which have lengthwise and crosswise grain. A specific structure may be plain weaves, twilled weaves, and the like, and densities of weft and warp are not particularly limited. Also, the knitted fabric may be a well-known knitted fabric, may be a weft-knitted fabric, a warp-knitted fabric, and the like, and for example, may be tricot in which threads are weft-knitted. Also, as shown in FIG. 1, the first support 130 may be non-woven fabric in which fabric does not have lengthwise and crosswise grain, and dry non-woven fabric such as chemical-bonded non-woven fabric, thermal-bonded non-woven fabric, aerated non-woven fabric, and the like, wet non-woven fabric, spanless non-woven fabric, well-known non-woven fabric manufactured using a variety of methods such as a needle-punched fabric and a melt-blown fabric may be used.

The first support 130 may occupy 90% or more of an entirety of a thickness of the filter medium to provide adequate mechanical strength and to prevent durability from being degraded according to backwashing. As an example, a thickness of the first support 130 may be 2 to 8 mm, preferably, 2 to 5 mm, and more preferably, 3 to 5 mm. For example, the first support 130 may have a thickness of 5 mm. When the thickness is less than 2 mm, adequate mechanical strength which can bear frequent backwashing may not be provided. Also, in the case of a thickness of more than 8 mm, when the filter medium is provided as a filter unit, which will be described below, and then a plurality of such filter units are provided as a filter module having a limited space, a degree of integration of the filter medium per unit volume of the module may be reduced.

Preferably, the first support 130 may satisfy conditions of the thickness simultaneously while a basis weight thereof may be 250 to 800 $g/m^2$, and more preferably, 350 to 600 $g/m^2$. For example, the first support 130 may have a basis weight of 500 $g/m^2$. When the basis weight is less than 250 $g/m^2$, it may be difficult to provide adequate mechanical strength and an adhesive force with the second support may be reduced. When the basis weight exceeds 800 $g/m^2$, an adequate flow path may not be formed, a flow rate may be reduced, and it may be difficult to smoothly perform backwashing due to an increase in a differential pressure.

Also, when the first support 130 is formed as fibers such as non-woven fabric, an average diameter of the fibers may be 5 to 50 µm, and preferably, 20 to 50 µm. For example, the average diameter of the fibers may be 35 µm. Also, the average pore diameter of the first support 130 may be 20 to 200 µm, and preferably, 30 to 180 µm. As an example, the average pore diameter of the first support 130 may be 100 µm. Porosity thereof may be 50 to 90%, and preferably, 55 to 85%. For example, the first support 130 may have a porosity of 70% but is not limited thereto. Any porosities and pore diameters capable of providing a target degree of mechanical strength simultaneously while easily forming a flow path even at high pressure by supporting the above-described nanofiber webs 111 and 112 during the filtration process and/or the backwashing process are available.

There is no limitation in a material of the first support 130 when the material is used as a support of a separation membrane. As a non-limiting example thereof, a synthetic polymer component selected from the group consisting of a polyester-based component, a polyurethane-based component, a polyolefin-based component, and a polyamide-based component or a natural polymer component including cellulose may be used. However, when the first support tends to be brittle, it may be difficult to provide a target degree of an adhesive force in a process of laminating the first support with the second support. This is because the first support does not have a smooth surface like a film and may have an uneven surface having porosity. The surface formed by fibers such as non-woven fabric may have an unsmooth surface according to an arrangement of fibers, deniers of fibers, and the like, and a degree thereof may be different for each position. When a part, which is not pressed against an interface between two laminated layers, is present and other parts are joined, delamination between layers may be started due to the part which is not pressed against the interface. To solve this, it is necessary to perform a lamination process while pressure is applied to the two layers from both directions such that an adhesion degree of the two layers is increased. However, in the case of a support having high brittleness, even when a pressure is applied, there is a limit in increasing adhesion between two layers. Since the support may be damaged when a higher pressure is applied, a material having high flexibility and a high elongation rate may be suitable as a material of the first support. Preferably, the first support 130 may have a polyolefin-based material to have excellent adhesion with the second supports 121 and 122.

Meanwhile, the first support 130 may include a low melting point component to be bound to the second supports 121 and 122 together without an additional adhesive or adhesive layer. When the first support 130 is whole cloth such as non-woven fabric, the first support may be manufactured using a first composite fiber 130a including a low melting point component. The first composite fiber 130a may include a support component and a low melting point component and may be disposed such that at least a part of the low melting point component is exposed from an outer surface. As an example, the first composite fiber 130a may be a sheath-core type composite fiber, in which the support component forms a core portion and the low melting point component surrounds the core portion, or a side-by-side composite fiber in which the low melting point component is disposed on one side of the support component. As described above, in terms of aspects of flexibility and an elongation rate of the support, the low melting point component and the support component may be a polyolefin. For example, the support component may be polypropylene and the low melting point component may be polyethylene-based component. Here, a melting point of the low melting point component may be 60 to 180° C.

Next, the second supports 121 and 122, which are disposed on both sides of the first support 130 and the nanofiber webs 111 and 112, which are described above.

The second supports 121 and 122 support the above-described nanofiber webs 111 and 112 and increase adhesive forces of layers provided in the filter medium.

The second supports 121 and 122 are not particularly limited to any components which conventionally perform a function of supports of the filter medium and may be in the form of a woven fabric, a knitted fabric, or non-woven fabric. The woven fabric refers to a fabric including fibers which have lengthwise and crosswise grain. A specific structure may be plain weaves, twilled weaves, and the like, and densities of weft and warp are not particularly limited. Also, the knitted fabric may be a well-known knitted fabric and may be a weft knitted fabric, a warp knitted fabric, and the like but is not limited particularly. Also, the non-woven fabric means that fibers included therein have no lengthwise and crosswise grain. Dry non-woven fabric such as chemical-bonded non-woven fabric, thermal-bonded non-woven fabric, aerated non-woven fabric, and the like, wet non-woven fabric, spanless non-woven fabric, and well-known non-woven fabric manufactured using a variety of methods such as a needle-punched fabric and a melt-blown fabric may be used.

The second supports 121 and 122 may be, for example, non-woven fabric. Here, fibers which form the second supports 121 and 122 may have an average diameter of 5 to 30 μm. A thickness of the second supports 121 and 122 may be 150 to 250 μm, and preferably, 160 to 240 μm, and for example, may be 200 μm.

Also, the second supports 121 and 122 may have an average pore diameter of 20 to 100 μm and porosity of 50 to 90%. However, the second supports are not limited thereto, and there is no limitation except that porosities and pore diameters capable of providing a target degree of mechanical strength by supporting the above-described nanofiber webs 111 and 112 and simultaneously not impeding a flow of a filtrate which flows through the nanofiber webs 111 and 112 should be used. As an example, the second supports 121 and 122 may have an average pore diameter of 60 μm and a porosity of 70%.

Also, a basis weight of the second supports 121 and 122 may be 35 to 80 g/m², more particularly, 40 to 75 g/m², and for example, may be 40 g/m². When the basis weight is less than 35 g/m², an amount of fibers which form the second supports and are distributed on an interface with the nanofiber webs 111 and 112 may be small such that an effective adhesion area of the second supports in contact with the nanofiber webs is reduced and a target degree of an adhesive force may not be provided. Also, problems may be present in which adequate mechanical strength capable of supporting the nanofiber webs is not provided and an adhesive force with the first support is reduced. Also, when the basis weight exceeds 80 g/m², it is difficult to secure a target flow rate and difficult to easily perform backwashing due to an increase in a differential pressure.

There is no limitation in a material of the second supports 121 and 122 when the material is used as a support of the filter medium. As a non-limiting example thereof, a synthetic polymer component selected from the group consisting of a polyester-based component, a polyurethane-based component, a polyolefin-based component, and polyamide-based component or a natural polymer component including cellulose may be used.

However, the second supports 121 and 122 may be a polyolefin-based polymer component to improve adhesion between the above-described nanofiber webs 111 and 112 and the first support 130. Also, when the second supports 121 and 122 are whole cloth such as non-woven fabric, the second supports 121 and 122 may be manufactured using a second composite fiber 121a including a low melting point component. The second composite fiber 121a may include a support component and a low melting point component and may be disposed such that at least a part of the low melting point component is exposed from an outer surface. As an example, the second composite fiber 121a may be a sheath-core type composite fiber, in which the support component forms a core portion and the low melting point component surrounds the core portion, or a side-by-side composite fiber in which the low melting point component is disposed on one side of the support component. As described above, in terms of aspects of flexibility and an elongation rate of the support, the low melting point component and the support component may preferably be a polyolefin-based component. For example, the support component may be polypropylene and the low melting point component may be polyethylene. Here, a melting point of the low melting point component may be 60 to 180° C.

When the above-described first support 130 is provided as the first composite fiber 130a including the low melting point component to provide a further improved adhesive force with the second supports 121 and 122, a more strongly fused portion arising from fusion of the low melting point component of the first composite fiber 130a and the low melting point components of the second composite fiber 121a may be formed on an interface between the first support 130 and the second support 121. Here, the first composite fiber 130a and the second composite fiber 121a may have the same type of material in terms of an aspect of compatibility.

Meanwhile, an attachment process of the filter medium 1000 according to one embodiment of the present invention may be more stably and easily performed, and a significantly high adhesive force is provided in an interface between layers. In order to minimize separation and delamination between layers even when a high external force is applied due to backwashing and the like, the first support 130 and the nanofiber webs 111 and 112 do not face each other directly and the second supports 121 and 122 having a smaller thickness are interposed therebetween.

Figure 4A:
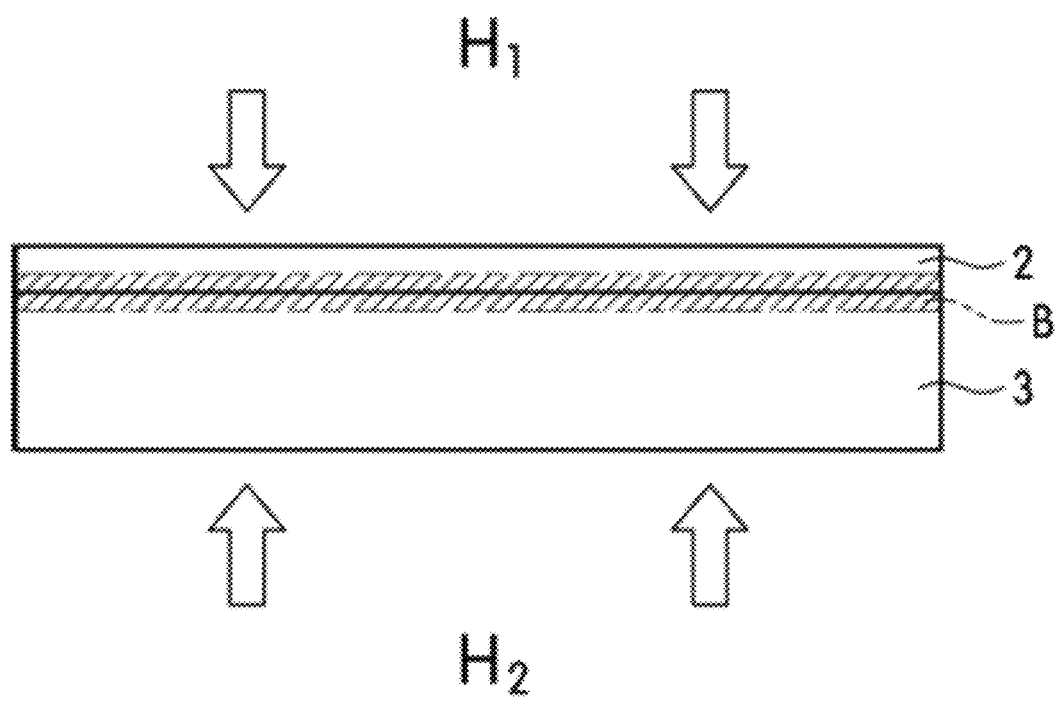
FIG. 4A is a view illustrating lamination between a nanofiber web and a second support.
Figure 4B:
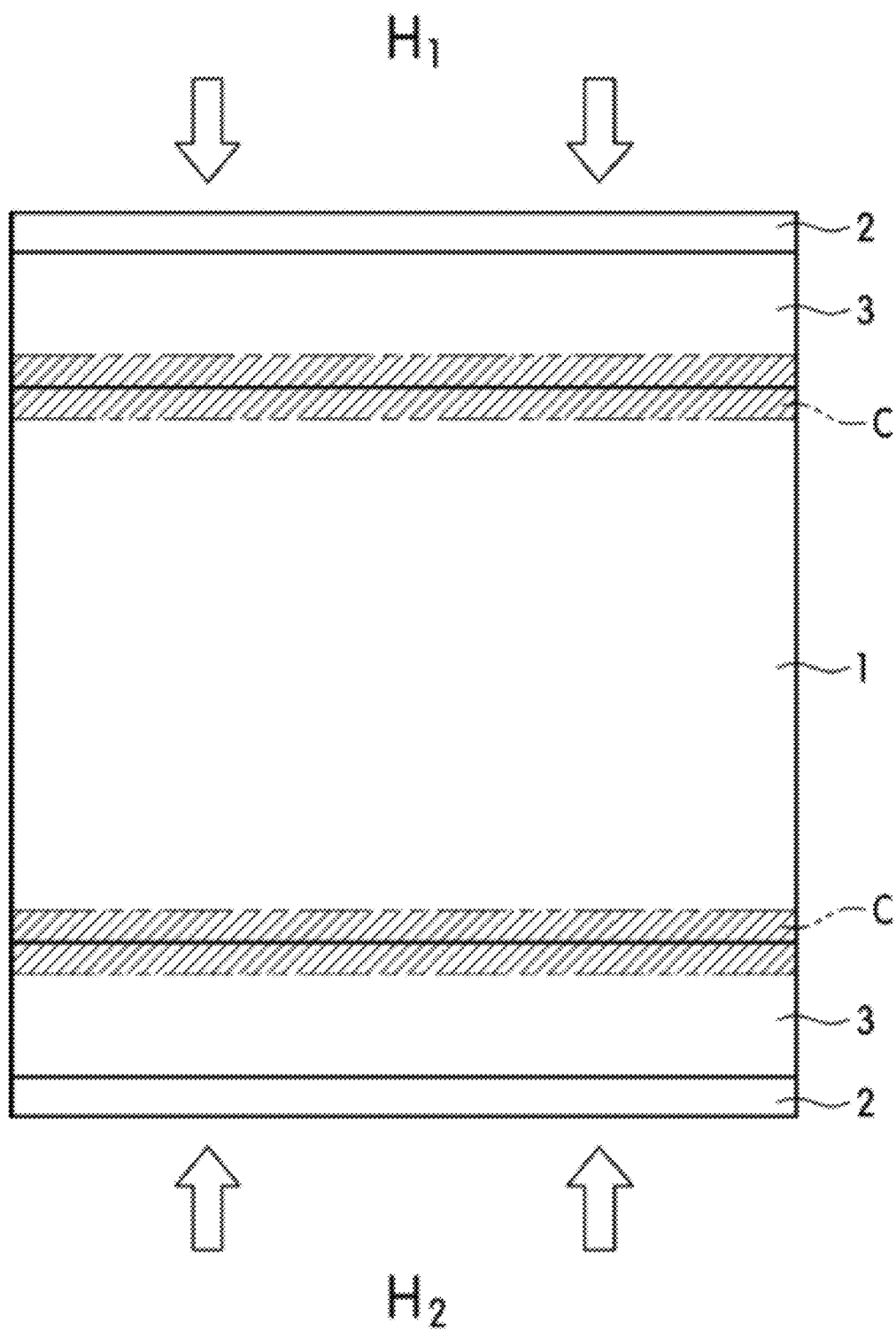
FIG. 4B is a view illustrating lamination performed by arranging the laminated nanofiber web and second structure on both sides of a first support.

Referring to FIG. 4A, since a difference between thicknesses of the nanofiber web 2 and a second support 3, which occupies less than 10% of an entirety of a thickness of the filter medium, is significantly smaller than a difference between thicknesses of the nanofiber web 2 and a first support 1, heat H1 and H2 applied from above and below lamination of the nanofiber web 2/the second support 3 reach an interface therebetween such that a fused portion B is easily formed. Also, since it is easy to adjust an amount and time of applied heat, it is advantageous for preventing physical/chemical deformation of the nanofiber web 2. Accordingly, when the nanofiber web 2 is bonded to the second support 3 as shown in FIG. 4A, nanofibers may be combined with the support having an excellent adhesive force as shown in FIG. 4B without a change in properties of the nanofiber web 2 which is initially designed.

Meanwhile, the filter medium 1000 according to a first embodiment of the present invention may be manufactured through operations including (1) forming a fiber web using nanofibers formed by electrospinning a spinning solution, (2) manufacturing lamination by laminating the fiber web with a second support, (3) forming a hydrophilic coating layer using a hydrophilic coating composition including a hydrophilic polymer compound including one or more types of functional groups selected from a hydroxyl group and a carboxyl group on at least a part of an outer surface of the nanofibers of the fiber web included in the lamination and a crosslinking agent including at least one sulfonic group, and (4) disposing and laminating the lamination including the hydrophilic coating layer on each of both sides of a first support such that the second support comes into contact with the first support.

First, (1) the forming of the fiber web using the nanofibers formed by electrospinning the spinning solution will be described.

The fiber web may be formed using any methods of forming a three-dimensional network-shaped fiber web using nanofibers without limitation. Preferably, the fiber web may be formed by electrospinning a spinning solution including a fluorine-based compound onto a second support.

The spinning solution may include, for example, a fluorine-based compound and a solvent as the fiber-forming component. 5 to 30 wt %, and preferably, 8 to 20 wt % of the fluorine-based compound may be included in the spinning solution. As an example, 15 wt % of the fluorine-based compound may be included in the spinning solution. When the fluorine-based compound is less than 5 wt %, it is difficult to form fibers. When being spun, the fluorine-based compound is not spun in a fiber shape and is sprayed in a droplet state to form a film shape. Otherwise, even when spinning is performed, many beads are formed and the solvent is not well volatilized such that a phenomenon in which pores are blocked during a calendering process which will be described may occur. Also, when the fluorine-based compound exceeds 30 wt %, viscosity increases and solidification occurs on a surface of the solution such that it is difficult to perform spinning for a long time, and a diameter of fibers increases such that it is impossible to form a fiber shape having a size of submicrometer.

As the solvent, any solvents may be used without limitation that do not generate precipitations while dissolving the fluorine-based compound which is a fiber-forming component and do not influence spinning properties of nanofibers, which will be described below. Preferably, any one or more selected from the group consisting of r-butyrolactone, cyclohexanone, 3-hexanone, 3-heptanone, 3-octanone, N-methylpyrrolidone, dimethylacetamide, acetone dimethyl sulfoxide, and dimethylformamide may be included. As an example, the solvent may be a mixed solvent of dimethylacetamide and acetone.

Nanofibers may be manufactured through a well-known electrospinning device and method using the manufactured spinning solution. As an example, as the electrospinning device, an electrospinning device including a single spinning pack including one spinning nozzle may be used or an electrospinning device including a plurality of single spinning packs or a spinning pack including a plurality of nozzles may be used for mass production. Also, as an electrospinning method, dry-spinning or wet-spinning including an external coagulating tub may be used and there is no restriction according to the method.

When an agitated spinning solution is injected into the electrospinning device and electrospun on a collector, for example, on paper, a nanofiber web formed of nanofibers may be obtained. As an example of a specific condition for the electrospinning may be that an air pressure of air spray of an air spray nozzle provided in a nozzle of the spinning pack may be set within a range of 0.01 to 0.2 MPa. When the air pressure is less than 0.01 MPa, there is no effect on collection and integration. When 0.2 MPa is exceeded, a phenomenon in which a cone of a spinning nozzle is solidified such that a needle is blocked occurs such that difficulties may occur in spinning. Also, when the spinning solution is spun, an injection speed of the spinning solution per nozzle may be 10 to 30 µl/min. Also, a distance between a tip of the nozzle and the collector may be 10 to 30 cm. However, the distance is not limited thereto and may be modified according to a purpose thereof.

Next, (2) the manufacturing of the lamination by laminating the fiber web with the second support will be described.

When the second support is provided using low melting point composite fibers, bonding between the fiber web and the second support through heat fusion may be performed at the same time through the calendering process.

Also, an additional hot-melt powder or hot-melt web may be further interposed to bind the second support to the fiber web. Here, a temperature of applied heat may be 60 to 190° C. and an applied pressure may be 0.1 to 10 kgf/cm$^2$ but the temperature and pressure are not limited thereto. However, components such as the hot-melt powder, which is separately added for binding, generate fumes or are melted in a process of laminating supports or laminating a support with nanofibers and block pores frequently such that it is impossible to achieve a flow rate of the filter medium which is initially planned. Also, since the components are soluble in a water treatment process such that environmentally adverse problems may be caused, the second support and the fiber web may be bound to each other without the components.

Next, (3) the forming of the hydrophilic coating layer using the hydrophilic coating composition including the hydrophilic polymer compound including one or more types of functional groups selected from a hydroxyl group and a carboxyl group on at least the part of the outer surface of the nanofibers of the fiber web included in the lamination and the crosslinking agent including at least one sulfonic group will be described.

According to one embodiment of the present invention, the operation (3) may include (3-1) forming the hydrophilic coating layer on the lamination by treating the hydrophilic coating composition and (3-2) removing the hydrophilic coating layer formed on the second support by cleaning the lamination on which the hydrophilic coating layer is formed.

In the operation (3-1), the hydrophilic coating composition may include the solvent, the hydrophilic polymer compound, and the crosslinking agent.

The solvent may include one or more types of solvents selected from the group consisting of purified water, ethanol, methanol, ethylene glycol, acetic acid, hexene, cyclohexene, cyclopentane, diisobutylene, 1-pentene, carbon disulfide, carbon tetrachloride, 1-chlorobutene, 1-chloropentane, o-xylene, diisopropyl ether, 2-chloropropane, toluene, diethyl ether, diethyl sulfide, dichloromethane, 4-methyl-2- propanone, tetrahydrofuran, 1,2-dichloroethane, 2-butanone, 1-nitropropane, acetone, 1,4-dioxane, ethyl acetate, methyl acetate, 1-pentanol, dimethyl sulfoxide, aniline, nitromethane, acetonitrile, pyridine, 2-butoxyethanol, 1-propanol, and 2-propanol, but is not limited thereto, and a well-known solvent which does not influence mixing and properties of the hydrophilic coating composition may be used.

Also, 0.3 to 1.5 parts by weight, and preferably, 0.5 to 1.3 parts by weight of the hydrophilic polymer compound may be included with respect to 100 parts by weight of the solvent. As an example, 1 part by weight of the hydrophilic polymer compound may be included with respect to 100 parts by weight of the solvent.

Meanwhile, the hydrophilic coating layer may be formed by crosslinking the hydrophilic polymer compound using the crosslinking agent.

The crosslinking agent may include sulfosuccinic acid and poly(styrene sulfonic acid-maleic acid) as described above. Here, when sulfosuccinic acid and poly(styrene sulfonic acid-maleic acid) are added together to the solvent, cohesion may occur in the crosslinking agent. Accordingly, as the solvent, a first solvent and a second solvent may be used. Solutions are manufactured by adding sulfosuccinic acid with the hydrophilic polymer compound together to the first solvent and adding poly(styrene sulfonic acid-maleic acid) to the second solvent, and then a first solution manufactured using the first solvent and a second solution manufactured using the second solvent may be mixed with each other. Here, the first solvent and the second solvent may be the same type of solvent or may be different solvents.

Also, the operation (3-2) is the removing of the hydrophilic coating layer formed on the second support by cleaning the lamination. When cleaning is performed, only the hydrophilic coating layer formed on the second support may be removed such that adhesion with the first support may be further improved.

Next, (4) the disposing and laminating of the lamination including the hydrophilic coating layer on each of both sides of the first support such that the second support comes into contact with the first support will be described.

In the operation (4), the first support and the second support may be melted by applying one or more of heat and pressure and laminated in order to dispose and laminate the nanofiber web and the second support, which are laminated, on each of both sides of the first support. Here, a specific method of applying heat and/or pressure may be selected from well-known methods. As a non-limiting example, a general calendering process may be used in which a temperature of applied heat may be 70 to 190° C. Also, when the calendering process is performed, the process may be divided into several operations and be performed a plurality of times. For example, secondary calendering may be performed after primary calendering. Here, degree(s) of heat and/or pressure, which are/is applied in the calendering processes, may be equal or different. The bonding between the second support and the first support through heat fusion may be performed through fusion of the first support and the second support such that an additional adhesive or an adhesive layer may be omitted.

Also, a filter medium 1000 according to a second embodiment of the present invention includes, as shown in FIG. 1, a first support 130 including a plurality of pores, nanofiber webs 111 and 112 disposed above and below the first support 130 and including nanofibers forming a three-dimensional network structure and a silver (Ag) antimicrobial layer formed on at least a part of an outer surface of the nanofibers, and second supports 121 and 122 including a plurality of pores and interposed between the first support 130 and the nanofiber webs 111 and 112, respectively.

The nanofiber webs 111 and 112 are provided on surfaces opposite to surfaces in contact with the second supports 121 and 122 and the first support 130, respectively. The nanofiber webs 111 and 112 may be formed by randomly arranging a single nanofiber or several threads of nanofibers.

A filter medium formed of only conventional nanofibers may effectively remove fine dust having a certain size and contaminants but does not have any means which sterilizes microbes such as bacteria and the like collected with the fine dust. Hence, the present invention provides the filter medium which includes the nanofiber webs 111 and 112 including the silver antibacterial layer formed on at least the part of the outer surface of the nanofibers so as to maintain an ability of removing fine dust and contaminants and additionally to have improved sterilizing power and antibacterial activity with respect to harmful microbes and the like.

The silver antibacterial layer may be formed by vapor-depositing silver on the nanofibers or by silver-plating the nanofibers. Here, being formed by vapor-depositing or by plating may cause a difference in shape of the covering silver antibacterial layer depending on a difference in manufacturing methods which will be described below. When the silver antibacterial layer is formed by plating, since a method and the like of dipping the nanofiber webs into a silver-plating solution is used, the silver antibacterial layer may be formed to cover an entirety of the outer surface of the nanofibers included in the nanofiber webs. Also, when the silver antibacterial layer is formed by vapor-depositing, since silver may be vapor-deposited only on the nanofibers exposed at a surface of an outer surface of the nanofiber webs, the silver antibacterial layer may be embodied such that silver covers only a part of the outer surface of the nanofibers exposed in order to cover the part of the outer surface of the nanofibers.

An average thickness of the silver antibacterial layer may be 5 to 120 nm, and preferably, 10 to 100 nm to provide excellent water permeability and antibacterial activity simultaneously and to maintain the antibacterial activity after backwashing. As an example, the average thickness of the silver antibacterial layer may be 50 nm. When the thickness of the silver antibacterial layer is less than 5 nm, since the covering silver antibacterial layer is delaminated during a backwashing process in which an excessive pressure is applied, a target degree of antibacterial activity may not be provided. Also, when the thickness of the silver antibacterial layer exceeds 120 nm, it is not easy to decrease a weight of the filter medium. Also, as a size and porosity of pores are reduced, water permeability of a solution to be filtered may be degraded.

Meanwhile, the average thickness of the silver antibacterial layer refers to an average thickness of an silver antibacterial layer formed by coating an outer surface of nanofibers when the silver antibacterial layer is formed by plating and refers to an average of an silver antibacterial layer formed on a part of an outer surface of nanofibers when the silver antibacterial layer is formed by vapor-depositing.

Also, in order to obtain an effect in which all of antibacterial activity, filtration efficiency, and durability are excellent at the same time, a weight of the silver antibacterial layer may be 30 to 500%, and preferably, 50 to 200% in comparison with the weight of the whole nanofibers. For example, the weight of the silver antibacterial layer may be 60% in comparison to a weight of the whole nanofibers when the silver antibacterial layer is formed by vapor-depositing and may be 133% in comparison with the weight of the whole nanofibers when the silver antibacterial layer is formed by plating. When the weight of the silver antibacterial layer is less than 30% in comparison with the weight of the whole nanofibers, an antibacterial effect may be degraded. When the weight is more than 500%, it is not easy to decrease a weight of the filter medium and a size of pores is decreased such that water permeability with respect to the solution to be filtered may be degraded.

Next, description on a fiber-forming component which forms the nanofiber webs 111 and 112 and an average diameter of the nanofibers are equal to those of the first embodiment of the present invention and as such will be omitted.

Also, an average pore diameter of the nanofiber webs 111 and 112 may be 0.1 to 3 μm, preferably, in a range of 0.15 to 2 μm, and for example, may be 0.25 μm. When the average diameter of the nanofiber webs 111 and 112 is less than 0.1 μm, water permeability with respect to a solution to be filtered may be degraded. When the average diameter exceeds 3 μm, filtration efficiency of the filter medium may not be high and an antibacterial effect may be degraded.

Also, porosity of the nanofiber webs 111 and 112 may be 50 to 90%, and preferably, in a range of 60 to 80%. For example, the porosity of the nanofiber webs 111 and 112 may be 70%. When the porosity of the nanofiber webs 111 and 112 is less than 50%, water permeability with respect to the solution to be filtered may be degraded. When the porosity exceeds 90%, filtration efficiency of the filter medium may not be high and an antibacterial effect may be degraded.

Also, description on other components included in the filter medium 1000 are equal to those of the first embodiment of the present invention and as such will be omitted.

Meanwhile, the filter medium 1000 according to the second embodiment of the present invention may be manufactured through operations including (1) forming a fiber web using nanofibers formed by electrospinning a spinning solution, (2) manufacturing a nanofiber web by including an silver antibacterial layer on at least a part of an outer surface of the nanofibers, (3) laminating the nanofiber web with a second support, and (4) disposing and laminating the nanofiber web and the second support, which are laminated, on each of both sides of a first support such that the second support comes into contact with the first support.

First, (1) the forming of the fiber web using nanofibers formed by electrospinning the spinning solution will be described.

The fiber web may be formed using any method of forming a three-dimensional network-shaped fiber web using nanofibers without limitation. Preferably, the fiber web may be formed by electrospinning a spinning solution including a fluorine-based compound onto the second support.

The spinning solution may include, for example, a fluorine-based compound and a solvent as the fiber-forming component. 5 to 30 wt %, and preferably, 8 to 20 wt % of the fluorine-based compound may be included in the spinning solution. When the fluorine-based compound is less than 5 wt %, it is difficult to form fibers. When being spun, the fluorine-based compound is not spun in a fiber shape and is sprayed in a droplet state to form a film shape. Otherwise, even when spinning is performed, many beads are formed and the solvent is not well volatilized such that a phenomenon in which pores are blocked during a calendering process which will be described may occur. Also, when the fluorine-based compound exceeds 30 wt %, viscosity increases and solidification occurs on a surface of the solution such that it is difficult to perform spinning for a long time, and a diameter of fibers increases such that it is impossible to form a fiber shape having a size of submicrometer.

As the solvent, any solvents may be used without limitation that do not generate precipitations while dissolving the fluorine-based compound which is a fiber-forming component and do not influence spinning properties of nanofibers, which will be described below. Preferably, any one or more selected from the group consisting of r-butyrolactone, cyclohexanone, 3-hexanone, 3-heptanone, 3-octanone, N-methylpyrrolidone, dimethylacetamide, acetone dimethyl sulfoxide, and dimethylformamide may be included. As an example, the solvent may be a mixed solvent of dimethylacetamide and acetone.

Description on electrospinning conditions and the like are equal to those of the above-described first embodiment and as such will be omitted.

Meanwhile, to add hydrophilicity to the outer surface of the nanofibers before performing the operation (2) which will be described below, hydrophilic coating may be performed, but the present invention is not limited thereto.

Next, (2) the manufacturing of the nanofiber web by including the silver antibacterial layer on at least the part of the outer surface of the nanofibers will be described.

The operation (2) may be embodied, as described above, using a first method of forming the silver antibacterial layer to surround an entirety of the outer surface of the nanofibers by plating the nanofibers forming the fiber web with silver and a second method of forming the silver antibacterial layer on at least the part of the outer surface of the nanofibers by vapor-depositing silver on the nanofibers exposed at one side of the fiber web.

First, the first method of forming the silver antibacterial layer to surround the entirety of the outer surface of the nanofibers by plating the nanofibers forming the fiber web with silver will be described. Although one of well-known silver-plating methods may be used in silver plating, in consideration of properties of the nanofibers, an electroless plating method may be used. Hereinafter, a method of plating the outer surface of the nanofibers forming the fiber web with silver using the electroless plating method will be described as a reference.

The electroless silver plating method uses a substitution reaction. In general, a method of silver-plating a surface of a target material, in which a material to be silver-plated is dipped into a silver-plating solution including a reducible silver-complexing material and is reduced to silver by adding a reductant thereto, is used.

The silver-plating solution may be a mixture solution including a reducible solution, which is substituted for silver, and a silver-providing solution which provides silver-complexing material. As the reducible solution, hydrazine ($N_2H_4$), lithium borohydride, sodium borohydride, aluminum borohydride, sodium hypophosphite ($NaH_2PO_2$), and the like, which are inorganic reductants, and formaldehyde (HCHO), acetaldehyde ($CH_3CHO$), benzaldehyde ($C_6H_5CHO$), acrolein ($CH_2=CHCHO$), glucose, and the like, which are organic reductants, may be used. Among these, glucose may be used. As a reductant aqueous solution, an aqueous solution in which concentration of a reductant is in a range of 2 to 20% (w/v) may be used.

As the silver-providing solution which provides a silver-complexing material, silver sulfate, silver nitrate, silver chloride, and the like may be used. Any well-known silver-providing solutions may be used without limitation in a range which has no influence on properties of the nanofibers.

The surface of the nanofibers forming the nanofiber webs 111 and 112 may be plated with silver by dipping the nanofiber webs 111 and 112 into the above-described silver-plating solution. In consideration of a thickness of covering silver and a surface area, the nanofiber webs 111 and 112 may be dipped into the silver-plating solution for 1 to 10 hours.

When dipping is performed for less than one hour, the surface of the nanofibers may not be plated adequately with silver such that antibacterial and sterilizing performance may be degraded. Also, when dipping is performed for more than ten hours, the surface of the nanofibers is plated excessively with silver such that there may be a problem in decreasing a weight of the filter medium and a size of pores decreases such that penetration of a solution to be filtered may be degraded.

Here, in a case of using a method of applying the reductant to the silver-plating solution, since a reduction reaction occurs not only on the surface of the material to be silver-plated but also in the silver-plating solution, the surface of the nanofiber webs are soaked in the reducible solution in a small quantity before being dipped into the silver-plating solution such that silver is obtained by reduction only on the surface of the nanofiber webs so as to prevent an unnecessary reduction reaction.

Meanwhile, in the present invention, a pretreatment process may be performed on the fiber web before the above-described electroless silver-plating in order to prevent antibacterial efficiency from being degraded by the plated silver antibacterial layer being taken off due to higher water pressure than usual in backwashing, to prevent pores of the filter medium from being blocked and damaged by separated metal particles, and/or to further prevent contamination of the filtrate from being induced. Here, the pretreatment process may be a catalyst-treatment operation or a nanofiber etching operation.

The catalyst-treatment operation is a treatment process for improving adhesion with a metal by initiating a chemical reaction with the metal on a surface of a fiber which is a nonconductor during electroless silver plating and may be an operation for forming an electroless plating film without stains on a surface of nanofiber. The etching operation may be a process for improving wettability of nanofibers with respect to the plating solution and obtaining an anchor effect.

Next, the second method of forming the silver antibacterial layer on at least the part of the outer surface of the nanofibers by vapor-depositing silver on the nanofibers exposed at one surface of the fiber web will be described.

A method of vapor-depositing silver may be any one selected from the group consisting of sputtering, ion plating, arc deposition, ion beam assisted deposition, and resistance heating vacuum evaporation. For example, as the method of vapor-depositing silver, a resistance heating vacuum evaporation method may be used.

In a resistance heating vacuum evaporation system, a silver vapor-depositing material, which is heated in a vacuum chamber and vaporized into a gas phase, may be provided at a top of a hot plate and a substrate holder may be disposed at a part facing the silver vapor-depositing material at a distance.

In the present invention, the fiber web, on which the silver vapor-depositing material will be vapor-deposited, is wound on a first bobbin disposed outside one side of the vacuum chamber and the fiber web passes through a bottom of the substrate holder at a certain speed while being guided by a guide roller in the vacuum chamber such that vapor deposition may be performed on the surface of the fiber web according to evaporation of the silver vapor-depositing material. Afterwards, the nanofiber webs 111 and 112, on which the silver vapor deposition layer is formed, are withdrawn to the other side of the vacuum chamber and are wound on a second bobbin such that silver vapor deposition may be consecutively performed.

Meanwhile, the present invention may further include forming a primer layer capable of maximizing adhesion between the silver antibacterial layer and the fiber web by performing surface treatment on the fiber web before the forming of the silver antibacterial layer through vapor deposition to prevent antibacterial efficiency from being degraded by the silver antibacterial layer being removed due to excessive water pressure which is higher than usual in backwashing, to prevent pores of the filter medium from being blocked and damaged by removed metal particles, and/or to further prevent contamination of the filtrate from being induced.

The primer layer may be formed through a process in which a nonvolatile primer material having polarity is applied and dried at a uniform thickness, in which methyl methacrylate, polyether modified dimethylpolysiloxane copolymer, methyl ethyl ketone, vinyl chloride-vinyl acetate copolymer, toluene, and the like may be used.

Also, instead of the surface treatment of the primer layer, an operation of performing plasma-treatment using a plasma generator installed in the vacuum chamber before vapor deposition may be further included. When the plasma treatment is performed on the fiber web, the surface of the fiber web is activated such that a polar functional group (OH– and H+) with respect to a metal material to be vapor-deposited is assigned and cleaned and fine prominences and depressions are formed so as to increase adhesion between the fiber web and the silver antibacterial layer. As a reaction gas used in the plasma treatment, any one of fluorocarbon ($CF_4$), argon (Ar), zenon (Ze), helium (He), nitrogen ($N_2$), oxygen ($O_2$), and a mixture thereof may be used.

Figure 6:
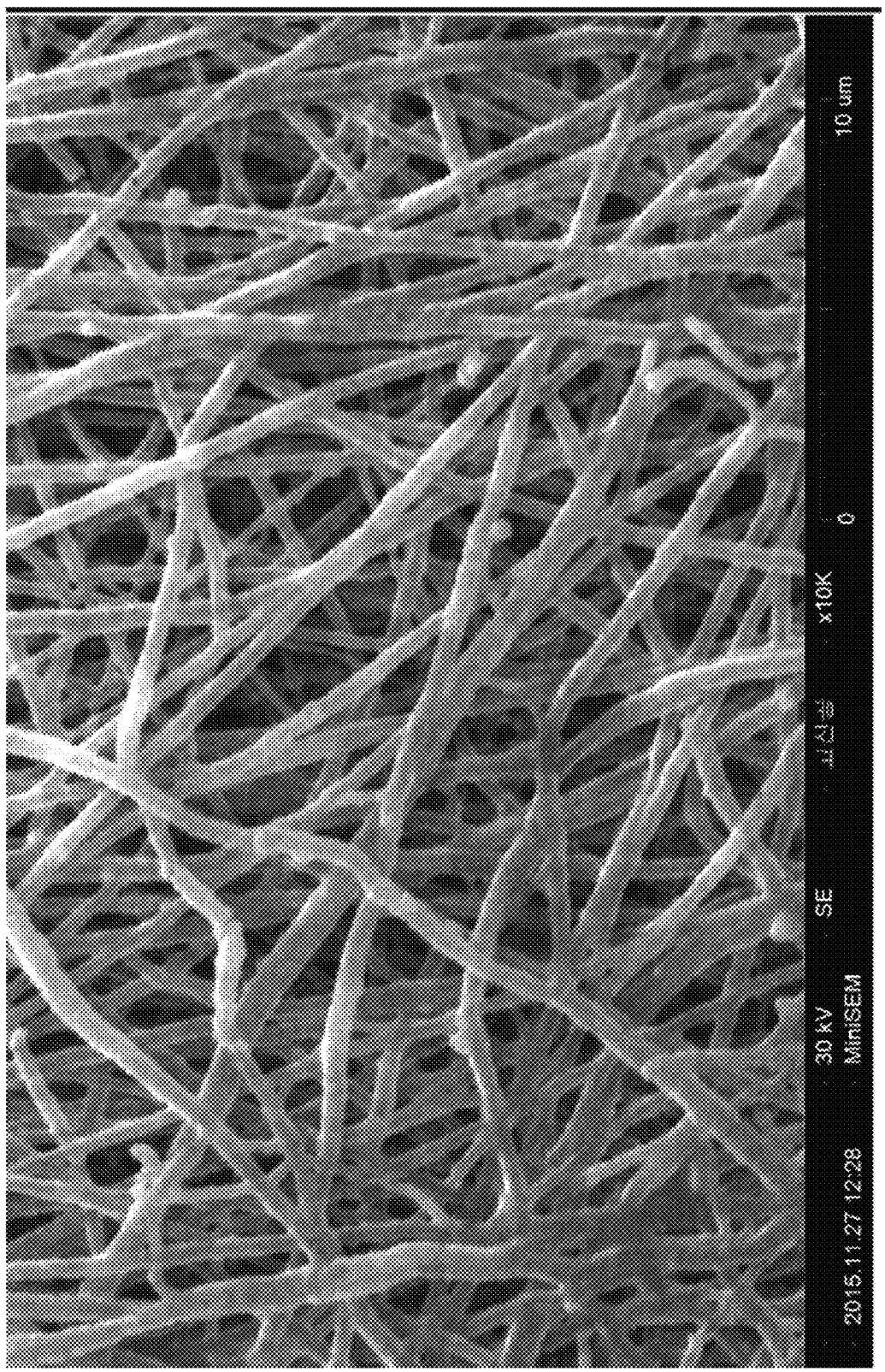
FIG. 6 is a scanning electron microscope (SEM) image illustrating a surface of the nanofiber web according to one embodiment of the present invention.

The nanofiber webs manufactured by performing the above-described operation (2) may include the silver antibacterial layer formed on at least the part of the outer surface of the nanofibers as shown in FIG. 6.

Next, (3) the laminating of the nanofiber web with the second support will be described.

When the second support is provided using low melting point composite fibers, bonding between the nanofiber web and the second support through heat fusion may be performed at the same time through the calendering process.

Also, an additional hot-melt powder or hot-melt web may be further interposed to bind the second support to the nanofiber web. Here, a temperature of applied heat may be 60 to 190° C. and an applied pressure may be 0.1 to 10 $kgf/cm^2$, but the temperature and pressure are not limited thereto. However, components such as the hot-melt powder, which is separately added for binding, generate fumes or are melted in a process of laminating supports or laminating a support with nanofibers and block pores frequently such that it is impossible to achieve a flow rate of the filter medium which is initially designed. Also, since the components are soluble in a water treatment process such that environmentally adverse problems may be caused, the second support and the nanofiber web may be bound to each other without the components.

Next, (4) the disposing and laminating of the nanofiber webs and the second support, which are laminated, on each of both sides of the first support such that the second support comes into contact with the first support will be described.

In the operation (4), the first support and the second support may be melted by applying one or more of heat and pressure and laminated in order to dispose and laminate the nanofiber web and the second support, which are laminated, on each of both sides of the first support. Here, a specific method of applying heat and/or pressure may be selected from well-known methods. As a non-limiting example, a general calendering process may be used in which a temperature of applied heat may be 70 to 190° C. Also, when the calendering process is performed, the process may be divided into several operations and be performed a plurality of times. For example, secondary calendering may be performed after primary calendering. Here, degree(s) of heat and/or pressure, which are/is applied in the calendering processes, may be equal or different. The bonding between the second support and the first support through heat fusion may be performed through fusion of the first support and the second support such that an additional adhesive or an adhesive layer may be omitted.

A filter medium 1000 according to a third embodiment of the present invention includes, as shown in FIG. 1, a first support 130 including a plurality of pores, nanofiber webs 111 and 112 disposed above and below the first support 130 and including nanofibers forming a three-dimensional network structure and a positively charged coating layer formed on at least a part of an outer surface of the nanofibers, and second supports 121 and 122 including a plurality of pores and interposed between the first support 130 and the nanofiber webs 111 and 112, respectively.

In general, viruses classified as pathogenic micro-organisms and pathogenic micro-organisms classified into *cryptosporidium, giardia*, and the like are discharged into environments through excrement of human bodies and animals and are present in not only sewage but also surface water and underground water. Viruses have a size in a range of 0.02 to 0.09 μm, and bacteria have a size in a range of 0.4 to 14 μm. Particularly, viruses have a very small size and thus are not treated through general filtration and form cysts with great resistance so as to stably live in water for several months or more.

In order to remove pathogenic micro-organisms such as viruses, high cohesion treatment or activated carbon adsorption, or membrane filtration are provided in a water treatment process. Particularly, much study with respect to membrane filtration has been performed such that practical use has been gauged in high water purification treatment process. However, due to economical costs and technical problems, the membrane filtration is not widely in use even until now.

Since micro fiber filters widely used for conventional water treatment have a small filtration area and have no electrostatic force, efficiency decreases. Membrane filters have high filtration efficiency but have a great loss in pressure. Accordingly, it is surely necessary to develop a filter medium which increases filtration efficiency with respect to micro pathogens such as viruses by adding an electrostatic force to a fiber filter having nano-sized pores for remedying shortcomings of a microfiber filter and a membrane filter.

The filter medium according to the present invention may adsorb contaminants such as viruses through electrochemical adsorbability by forming the positively charged coating layer on the nanofibers and simultaneously easily removing the contaminants by embodying the nanofiber webs 111 and 112 formed by randomly arranging one thread of a nanofiber or several threads of nanofibers as the filter medium.

Figure 3A:
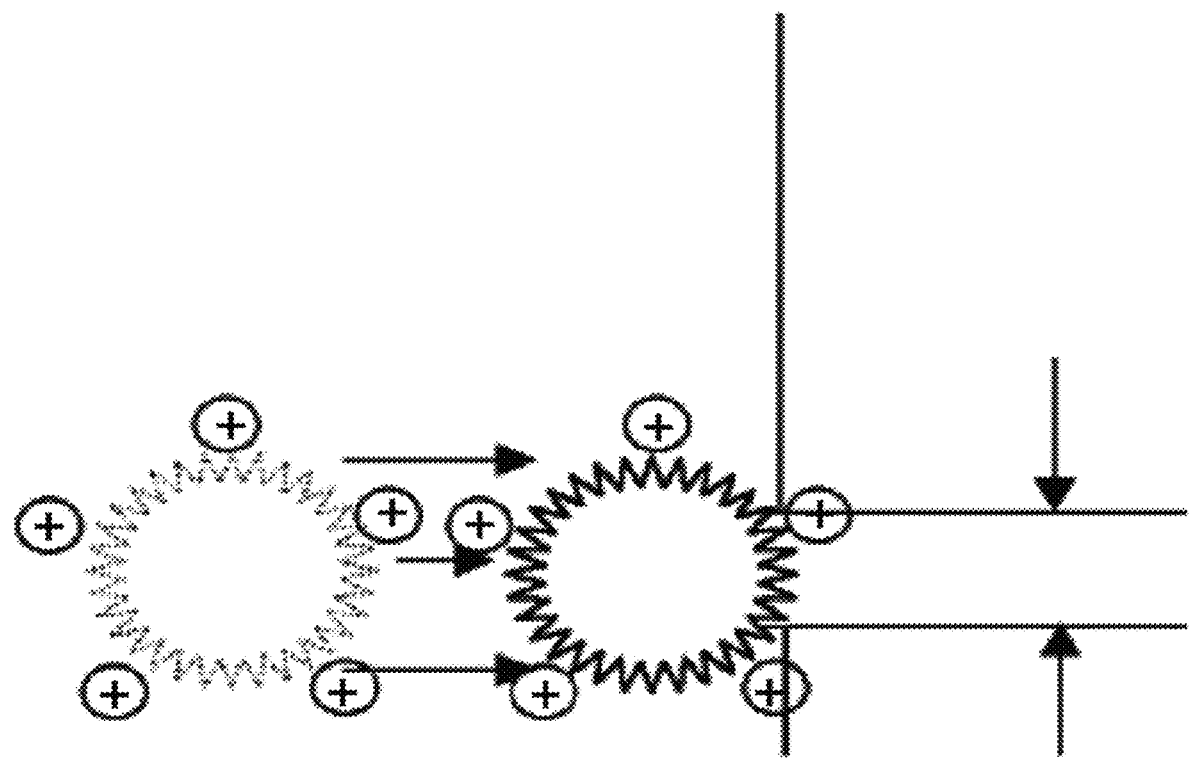
Figure 3B:
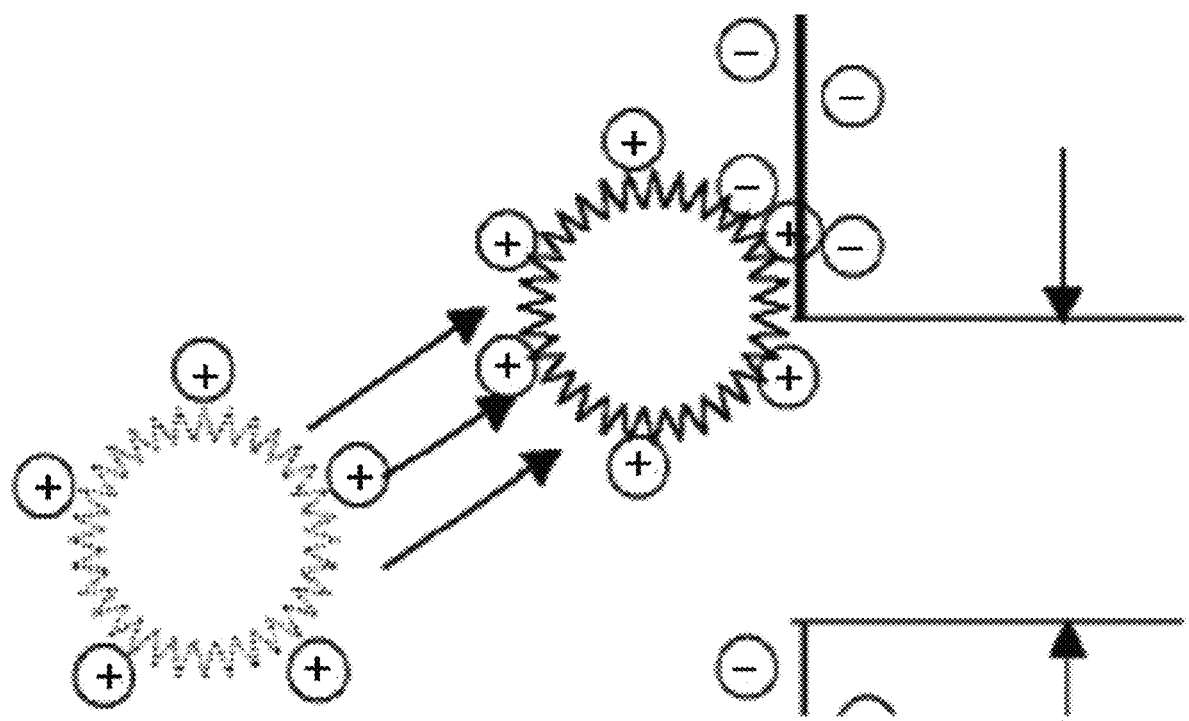

That is, referring to FIGS. 1, 3A, and 3B, the filter medium 1000 according to the present invention includes the second supports 121 and 122 and the nanofiber webs 111 and 112 sequentially laminated above and below the first support 130 and has a filtration flow in which a filtrate filtered by the nanofiber webs 111 and 112 flows toward the first support 130. Here, micro pathogens such as viruses and the like, which pass through the nanofiber webs 111 and 112, may be effectively filtered out as shown in FIGS. 3A and 3B.

In more detail, general micro-contaminants such as viruses having negative ions may be electrochemically adsorbed with a positively charged coating layer formed on a surface of a plurality of nanofibers forming the nanofiber webs due to electrostatic attraction. That is, the positively charged coating layer may be formed in the form of small charged molecules of a positively charged compound included therein or a copolymer in which positively charged atoms are straightly chained or diverged according to or a copolymer chain length. Contaminants, which are included in the solution to be filtered and have positive ions, are adsorbed with the positively charged compound of the positively charged coating layer due to electrostatic attraction and included to be precipitated on the surface of the nanofiber webs to be filtered. Here, removal performance with respect to contaminants having negative ions may vary according to charge density of the positively charged compound, and the charge density of the positively charged compound may be adequately selected in consideration of a type and charge density of target contaminants.

The positively charged coating layer may include, as the positively charged compound, one or more metallic complex compounds selected from the group consisting of silver, copper, zinc, cadmium, mercury, antimony, gold, aluminum, platinum, palladium, and a mixture thereof, and more preferably, silver and/or copper.

Also, the positively charged coating layer may include, as the positively charged compound, one or more types of compounds selected from the group consisting of aluminate, aluminum alkoxide, cationic silica, polyethyleneimine, melamine-formaldehyde, polyamine-epichlorohydrin, and aliphatic polyamine. The aluminate may be one or more types of compounds selected from the group consisting of aluminum sulfate, sodium aluminate, aluminum chloride, aluminum nitrate, and aluminum hydroxide. The aluminum alkoxide may be one or more types of compounds selected from the group consisting of aluminum isopropoxide, aluminum ethoxide, and aluminum t-butoxide.

When the nanofibers are coated with the positively charged coating layer with a certain thickness or more, since an average pore diameter and/or porosity of the nanofiber webs may decrease due to the coated nanofibers, water permeability and filtration efficiency may be degraded. When the nanofibers are coated less than the certain thickness, since the filtration efficiency may be significantly degraded, the positively charged coating layer may be formed within a certain thickness range. Accordingly, the positively charged coating layer according to the present invention may be formed to have a thickness in a range of 5 to 20%, and preferably, in a range of 8 to 18% in comparison with an average diameter of the nanofibers. As an example, the positively charged coating layer may be formed to have a thickness of 12% in comparison with the average diameter of the nanofibers. When the positively charged coating layer is formed to have a thickness of less than 5% in comparison with the average diameter of the nanofibers, since the positively charged coating layer is delaminated during a backwashing process in which an excessive pressure is applied, filtration efficiency with respect to contaminants such as microbes, an anionic compound, viruses, and the like may not be provided as a target level. When the positively charged coating layer is formed to have a thickness of more than 20%, it is not easy to decrease a weight of the filter medium. Also, as a size and porosity of pores are reduced, water permeability of the solution to be filtered may be degraded.

Here, a reference of the average thickness of the positively charged coating layer may vary according to a method of forming a positively charged coating layer which will be described. As an example, the reference refers to an average thickness of the positively charged coating layer formed to cover the outer surface of the nanofibers when the positively charged coating layer is formed using a plating method or a method using a coating composition and refers to an average thickness of the positively coating layer formed on a part of the outer surface of the nanofibers when the positively charged coating layer is formed through vapor deposition.

Meanwhile, the positively charged coating layer may be formed by curing a coating composition including a solvent, a positively charged compound, and a binder such that the positively charged coating layer may include the positively charged compound and the cured binder at a weight ratio in a range of 1:0.03 to 1:1.7, and preferably, at a weight ratio in a range of 1:0.06 to 1:0.9. As an example, the weight ratio between the positively charged compound and the cured binder may be 1:0.2. When the weight ratio between the positively charged compound and the cured binder is less than 1:0.03, as the positively charged coating layer is delaminated during a backwashing process in which an excessive pressure is applied, durability against backwashing is degraded such that a desirable degree of filtration efficiency with respect to contaminants such as microbes, an anionic compound, viruses, and the like may not be provided and the positively charged compound may remain in a filtrate. When the weight ratio exceeds 1:1.7, as electrostatic attraction of the positively charged compound is relatively degraded outside the positively charged coating layer, a desirable degree of filtration efficiency with respect to contaminants such as microbes, an anionic compound, viruses, and the like may not be provided and a size and porosity of pores are reduced such that water permeability of the solution to be filtered may be degraded.

Also, the positively charged coating layer may be formed by vapor-depositing or plating with the positively charged compound to cover at least a part of the outer surface of the nanofibers. Here, since the positively charged coating layer may be formed using different methods, the positively charged coating layer, which is formed, may have a difference in a shape thereof. When the positively charged coating layer is formed by plating, since a method and the like of dipping fiber webs into a positively charged compound plating solution is used, the positively charged coating layer may be formed to cover an entirety of the outer surface of nanofibers included in the fiber webs. Also, when the positively charged coating layer is formed through vapor deposition, since the positively charged compound may be vapor-deposited only on nanofibers exposed at the surface of the outer surface of the nanofiber webs on the basis of an upper part, the positively charged coating layer may be embodied as a shape in which the positively charged compound covers only a part of the outer surface of the exposed nanofibers to cover the part of the outer surface of the nanofibers.

Also, the nanofiber webs provided in the filter medium according to the present invention may further include a hydrophilic coating layer interposed between the positively charged coating layer and the outer surface of the nanofibers in order to easily form the positively charged coating layer and to further increase adhesion between the nanofibers and the positively charged coating layer. Here, when the positively charged coating layer is formed of the coating composition, the hydrophilic coating layer may be applied in cases of both plating and vapor deposition. Preferably, applying of the hydrophilic coating layer may be advantageous to improvement in an adhesive property of the positively charged coating layer when the positively charged coating layer is formed of a coating composition.

The hydrophilic coating layer may be formed including a hydrophilic polymer or may be formed by crosslinking a hydrophilic polymer using a crosslinking agent. The hydrophilic polymer may be any one of PVA, EVOH, sodium alginate, and the like, and a mixture thereof and, most preferably, may be PVA. Also, as the crosslinking agent, any well-known crosslinking agents including a functional group capable of crosslinking through a condensation reaction and the like with a hydroxyl group included in the hydrophilic polymer may be used without limitation. As an example, the functional group may be one of a hydroxyl group, a carboxyl group, and the like.

Meanwhile, the hydrophilic coating layer may be formed by crosslinking a crosslinking agent including PVA and a carboxyl group in order to provide a further improved adhesive property.

The crosslinking agent may be a component including a carboxyl group to be crosslinked with the PVA and may include, for example, one or more types of materials selected from the group consisting of poly(acrylic acid-maleic acid), polyacrylic acid, and poly(styrene sulfonic acid-maleic acid). Also, the crosslinking agent may be a multifunctional crosslinking agent including three or more carboxyl groups for the further improved adhesive property between the nanofibers of the hydrophilic coating layer and the positively charged coating layer. When the crosslinking agent includes less than three carboxyl groups, it is difficult to form a hydrophilic coating layer. Even when a hydrophilic coating layer is formed, the hydrophilic coating layer may be easily delaminated due to low adhesion. As an example, a crosslinking agent including three or more carboxyl groups may be poly(acrylic acid-maleic acid).

Accordingly, the hydrophilic coating layer may be formed to have a thickness in a range of 5 to 20%, and preferably, in a range of 8 to 18% in comparison with an average diameter of the nanofibers. As an example, the hydrophilic coating layer may be formed to have a thickness of 12% in comparison with the average diameter of the nanofibers. When the hydrophilic coating layer is formed to have a thickness of less than 5% in comparison with the average diameter of the nanofibers, since a target degree of the adhesive property is not embodied such that the hydrophilic coating layer and the positively charged coating layer are delaminated during a backwashing process in which an excessive pressure is applied, filtration efficiency with respect to contaminants such as microbes, an anionic compound, viruses, and the like may not be provided as a target degree. When the hydrophilic coating layer is formed to have a thickness of more than 20%, it is not easy to decrease a weight of the filter medium. Also, as a size and porosity of pores are reduced, water permeability of the solution to be filtered may be degraded.

Next, description on a fiber-forming component which forms the nanofiber webs 111 and 112 and an average diameter of the nanofibers are equal to those of the first embodiment of the present invention and as such will be omitted.

Also, an average pore diameter of the nanofiber webs 111 and 112 may be 0.1 to 3 μm, preferably, in a range of 0.15 to 2 μm, and for example, may be 0.25 μm. When the average diameter of the nanofiber webs 111 and 112 is less than 0.1 μm, water permeability with respect to a solution to be filtered may be degraded. When the average diameter exceeds 3 μm, filtration efficiency with respect to contaminants such as microbes, an anionic compound, viruses, and the like may not be high.

Also, porosity of the nanofiber webs 111 and 112 may be 40 to 90%, and preferably, in a range of 45 to 80%. For example, the porosity of the nanofiber webs 111 and 112 may be 45%. When the porosity of the nanofiber webs 111 and 112 is less than 40%, water permeability with respect to a solution to be filtered may be degraded. When the porosity exceeds 90%, filtration efficiency of the filter medium with respect to contaminants such as microbes, an anionic compound, viruses, and the like may not be high.

Also, description on other components included in the filter medium 1000 are equal to those of the first embodiment of the present invention and as such will be omitted.

Meanwhile, the filter medium 1000 according to the third embodiment of the present invention may be manufactured through operations including (1) forming a fiber web using nanofibers formed by electrospinning a spinning solution, (2) manufacturing a nanofiber web by including a positively charged coating layer including a positively charged compound on at least a part of an outer surface of the nanofibers, (3) laminating the nanofiber web with a second support, and (4) disposing and laminating the nanofiber web and the second support, which are laminated, on each of both sides of a first support such that the second support comes into contact with the first support.

First, (1) the forming of the fiber web using nanofibers formed by electrospinning the spinning solution will be described.

The fiber web may be formed using any method of forming a three-dimensional network-shaped fiber web using nanofibers without limitation. Preferably, the fiber web may be formed by electrospinning a spinning solution including a fluorine-based compound onto the second support.

The spinning solution may include, for example, a fluorine-based compound and a solvent as the fiber-forming component. 5 to 30 wt %, and preferably, 8 to 20 wt % of the fluorine-based compound may be included in the spinning solution. As an example, 15 wt % of the fluorine-based compound may be included in the spinning solution. When the fluorine-based compound is less than 5 wt %, it is difficult to form fibers. When being spun, the fluorine-based compound is not spun in a fiber shape and is sprayed in a droplet state to form a film shape. Otherwise, even when spinning is performed, many beads are formed and the solvent is not well volatilized such that a phenomenon in which pores are blocked during a calendering process which will be described may occur. Also, when the fluorine-based compound exceeds 30 wt %, viscosity increases and solidification occurs on a surface of the solution such that it is difficult to perform spinning for a long time, and a diameter of fibers increases such that it is impossible to form a fiber shape having a size of submicrometer.

As the solvent, any solvents may be used without limitation that do not generate precipitations while dissolving the fluorine-based compound which is a fiber-forming component and do not influence spinning properties of nanofibers, which will be described below. Preferably, any one or more selected from the group consisting of r-butyrolactone, cyclohexanone, 3-hexanone, 3-heptanone, 3-octanone, N-methylpyrrolidone, dimethylacetamide, acetone dimethyl sulfoxide, and dimethylformamide may be included. As an example, the solvent may be a mixed solvent of dimethylacetamide and acetone.

Meanwhile, description on electrospinning conditions and the like are equal to those of the above-described first embodiment and as such will be omitted.

Next, (2) the manufacturing of the nanofiber web by including the positively charged coating layer including the positively charged compound on at least the part of the outer surface of the nanofibers will be described.

Accordingly to one embodiment, the operation (2) may include (2-1) preparing a positively charged coating composition including a solvent, a positively charged compound, and a binder and (2-2) manufacturing the nanofiber web including the positively charged coating layer by treating the fiber web with the positively charged coating composition.

In the operation (2-1), the solvent included in the positively charged coating composition may include one or more types of solvents selected from the group consisting of purified water, ethanol, methanol, ethylene glycol, acetic acid, hexene, cyclohexene, cyclopentane, diisobutylene, 1-pentene, carbon disulfide, carbon tetrachloride, 1-chlorobutene, 1-choloropentane, o-xylene, diisopropyl ether, 2-chloropropane, toluene, diethyl ether, diethyl sulfide, dichloromethane, 4-methyl-2-propanone, tetrahydrofuran, 1,2-dichloroethane, 2-butanone, 1-nitropropane, acetone, 1,4-dioxane, ethyl acetate, methyl acetate, 1-pentanol, dimethyl sulfoxide, aniline, nitromethane, acetonitrile, pyridine, 2-butoxyethanol, 1-propanol, and 2-propanol, but is not limited thereto, and a well-known solvent which does not influence mixing and properties of the coating composition may be used.

3 to 30 parts by weight, and preferably, 5 to 25 parts by weight of the positively charged compound may be included with respect to 100 parts by weight of the solvent. As an example, 15 parts by weight of the positively charged compound may be included with respect to 100 parts by weight of the solvent. When the positively charged compound is less than 3 parts by weight with respect to 100 parts by weight of the solvent, a content of a positively charged material covering the nanofibers is low such that adsorption performance of the filter medium with respect to contaminants having negative ions may be degraded. When the positively charged compound exceeds 30 parts of weight, a content of the positively charged compound is excessively high such that mechanical properties of the nanofibers forming the positively charged coating layer is degraded such that the nanofibers are segmented or secede from the nanofiber web during backwashing and filtration efficiency and water permeability are degraded.

Also, the binder increases an adhesive force of the positively charged coating layer to prevent easy separation from the surface of the nanofibers and may be included 1 to 5 parts by weight, and preferably, 1.5 to 4.5 parts by weight with respect to 100 parts by weight of the solvent. As an example, the binder may be included 3 parts by weight with respect to 100 parts by weight of the solvent. When the binder is less than 1 part by weight with respect to 100 parts by weight of the solvent, as the positively charged coating layer is delaminated during a backwashing process in which an excessive pressure is applied, durability against backwashing is degraded such that filtration efficiency with respect to contaminants such as microbes, cationic compounds, viruses, and the like may not be provided as a target degree and the positively charged compound may remain in filtrate. When 5 parts by weight is exceeded, a size and porosity of pores are reduced such that water permeability of a solution to be filtered may be degraded.

Afterwards, as the operation (2-2), an operation of forming the positively charged coating layer by treating the nanofiber web with the coating composition is performed.

As the coating method, any well-known coating method which has no influence on properties of the nanofiber web having nanofibers and fine porosity may be used without limitation, and preferably, a dip coating process or a spray coating process may be used.

When the dip coating process is used as an example of the coating process, the nanofiber web, on which the positively charged coating layer is formed, may be obtained by dipping and agitating the nanofiber web to be coated in the coating composition at room temperature under atmospheric conditions, removing an unreacted material through filtration, cleaning the nanofiber web using deionized (Di)-water, and drying the nanofiber web at room temperature.

When the spray process is used as another example of the coating process, it is possible to design a process in which a coating composition suctioned in one direction is sprayed on and covers the surface of the nanofiber web. Here, the coating composition may be suctioned from separate lines in one line at the same time and then mixed (in-line mixed) due to a difference in pressures applied by spraying. Afterwards, the positively charged coating layer may be formed by spraying the coating composition onto a surface of a medium through a spray outlet.

Meanwhile, when the positively charged coating layer is formed by treating the nanofiber web with the coating composition, an operation of forming a hydrophilic coating layer may be further included between the operations (1) and (2) in order to improve adhesion between the nanofibers and the positively charged coating layer.

The hydrophilic coating layer may be formed including a hydrophilic polymer or may be formed by crosslinking a hydrophilic polymer using a crosslinking agent. When the hydrophilic polymer is formed by crosslinking using the crosslinking agent, the crosslinking agent may be included in a range of 3 to 20 parts by weight, and preferably, in a range of 8 to 15 parts by weight with respect to 100 parts by weight of the hydrophilic polymer. As an example, 15 parts by weight of the crosslinking agent may be included with respect to 100 parts by weight of the hydrophilic polymer. When the crosslinking agent is less than 3 parts by weight with respect to 100 parts by weight of the hydrophilic polymer, a target degree of an adhesive property between the nanofibers and the positively charged coating layer may not be provided. When the crosslinking agent is more than 20 parts by weight, porosity and a mechanical property of the nanofibers are degraded such that the nanofibers may be segmented or secede from the nanofiber web in backwashing and filtration efficiency and water permeability may be degraded.

Also, according to another embodiment of the present invention, the operation (2) may be embodied using a method of forming the positively charged coating layer by plating the nanofibers with the positively charged compound to surround an entirety of the outer surface of the nanofibers.

Although one of well-known positively charged compound plating methods may be used in positively charged compound-plating, in consideration of properties of the nanofibers, an electroless plating method may be used. Hereinafter, a method of plating the outer surface of the nanofibers forming the fiber web with the positively charged compound using the electroless plating method will be described as a reference.

The electroless plating method uses a substitution reaction. In general, a method of plating a surface of a target material, in which a material to be plated is dipped into a plating solution including a reducible complexing material and is reduced to a positively charged compound by adding a reductant thereto, is used.

The plating solution may be a mixture solution including a reducible solution, which is substituted for a positively charged compound, and a positively charged compound providing solution which provides a complexing material. As the reducible solution, hydrazine ($N_2H_4$), lithium borohydride, sodium borohydride, aluminum borohydride, sodium hypophosphite ($NaH_2PO_2$), and the like, which are inorganic reductants, and formaldehyde (HCHO), acetaldehyde ($CH_3CHO$), benzaldehyde ($C_6H_5CHO$), acrolein ($CH_2=CHCHO$), glucose, and the like, which are organic reductants, may be used. Among these, glucose may be used. As a reductant aqueous solution, an aqueous solution in which concentration of a reductant is 2 to 20% (w/v) may be used.

Also, as the positively charged compound providing solution, one of well-known positively charged compound providing solutions may be used without limitation within a range which has no influence on properties of the nanofibers.

The positively charged coating layer may be formed on the surface of the nanofibers forming the nanofiber webs 111 and 112 by dipping the nanofiber webs 111 and 112 into the above-described plating solution. In consideration of a thickness of the positively charged coating layer being plated and a surface area, the nanofiber webs 111 and 112 may be dipped into the plating solution for 1 to 10 hours. When dipping is performed for less than one hour, the surface of the nanofibers may not be plated adequately with the positively charged compound such that filtration performance with respect to contaminants such as microbes, anionic compounds, viruses, and the like may be degraded. Also, when dipping is performed for more than ten hours, the surface of the nanofibers is plated excessively with the positively charged compound such that there may be a problem in decreasing a weight of the filter medium and a size of pores decreases such that penetration of a solution to be filtered may be degraded.

Here, in a case of using a method of applying the reductant to the plating solution, since a reduction reaction occurs not only on the surface of the material to be plated but also in the plating solution, the surface of the nanofiber webs are soaked in the reducible solution in a small quantity before being dipped into the plating solution such that the positively charged compound is obtained by reduction only on the surface of the nanofiber webs so as to prevent an unnecessary reduction reaction.

Meanwhile, in the present invention, a pretreatment process may be performed on the fiber web before the above-described electroless plating in order to prevent filtration performance with respect to contaminants such as microbes, anionic compounds, viruses, and the like from being degraded after backwashing by the plated positively charged coating layer being taken off in backwashing due to excessive water pressure which is higher than usual, to prevent pores of the filter medium from being blocked and damaged by the taken-off positively charged compound, and/or to further prevent contamination of the filtrate from being induced. Here, the pretreatment process may be a catalyst-treatment operation or a nanofiber etching operation.

The catalyst-treatment operation is a treatment process for improving adhesion with a metal by initiating a chemical reaction with the metal on a surface of a fiber which is a nonconductor during electroless plating and may be an operation for forming an electroless plating film without stains on a surface of nanofiber. The etching operation may be a process for improving wettability of nanofibers with respect to the plating solution and obtaining an anchor effect.

Also, according to another embodiment of the present invention, the operation (2) may be embodied using a method of forming the positively charged coating layer on a part of the outer surface of the nanofibers by vapor-depositing the positively charged compound on the nanofibers exposed at one surface of the fiber web.

A method of vapor-depositing the positively charged compound may be any one selected from the group consisting of sputtering, ion plating, arc deposition, ion beam assisted deposition, and resistance heating vacuum evaporation. For example, as the method of vapor-depositing the positively charged compound, a resistance heating vacuum evaporation method may be used.

In a resistance heating vacuum evaporation system, a positively charged compound vapor-depositing material, which is heated in a vacuum chamber and vaporized into a gas phase, may be provided at a top of a hot plate and a substrate holder may be disposed at a part facing the positively charged compound vapor-depositing material at a distance.

In the present invention, the fiber web, on which the positively charged compound vapor-depositing material will be vapor-deposited, is wound on a first bobbin disposed outside one side of the vacuum chamber and the fiber web passes through a bottom of the substrate holder at a certain speed while being guided by a guide roller in the vacuum chamber such that vapor deposition may be performed on the surface of the fiber web according to evaporation of the positively charged compound vapor-depositing material. Afterwards, the nanofiber webs 111 and 112, on which the positively charged coating layer is formed, are withdrawn to the other side of the vacuum chamber and are wound on a second bobbin such that positively charged compound vapor-deposition may be consecutively performed.

Meanwhile, the present invention may further include forming a primer layer capable of maximizing adhesion between the positively charged coating layer and the fiber web by performing surface treatment on the fiber web before the forming of the positively charged coating layer through vapor deposition to prevent filtration performance with respect to contaminants such as microbes, anionic compounds, viruses, and the like after backwashing from being degraded by the positively charged coating layer being removed due to excessive water pressure which is higher than usual in backwashing, to prevent pores of the filter medium from being blocked and damaged by removed metal particles, and/or to further prevent contamination of the filtrate from being induced.

The primer layer may be formed through a process in which a nonvolatile primer material having polarity is applied and dried at a uniform thickness, in which methyl methacrylate, polyether modified dimethylpolysiloxane copolymer, methyl ethyl ketone, vinyl chloride-vinyl acetate copolymer, toluene, and the like may be used.

Also, instead of the surface treatment of the primer layer, an operation of performing plasma-treatment using a plasma generator installed in the vacuum chamber before vapor deposition may be further included. When the plasma treatment is performed on the fiber web, the surface of the fiber web is activated such that a polar functional group (OH– and H+) with respect to a metal material to be vapor-deposited is assigned and cleaned and fine prominences and depressions are formed so as to increase adhesion between the fiber web and the positively charged coating layer. As a reaction gas used in the plasma treatment, any one of fluorocarbon ($CF_4$), argon (Ar), zenon (Ze), helium (He), nitrogen ($N_2$), oxygen ($O_2$), and a mixture thereof may be used.

Next, (3) the laminating of the nanofiber webs with the second support will be described.

When the second support is provided using low melting point composite fibers, bonding between the nanofiber web and the second support through heat fusion may be performed at the same time through the calendering process.

Also, an additional hot-melt powder or hot-melt web may be further interposed to bind the second support to the nanofiber web. Here, a temperature of applied heat may be 60 to 190° C. and an applied pressure may be 0.1 to 10 kgf/cm$^2$ but the temperature and pressure are not limited thereto. However, components such as the hot-melt powder, which is separately added for binding, generate fumes or are melted in a process of laminating supports or laminating a support with nanofibers and block pores frequently such that it is impossible to achieve a flow rate of the filter medium which is initially designed. Also, since the components are soluble in a water treatment process such that environmentally adverse problems may be caused, the second support and the nanofiber web may be bound to each other without the components.

Next, (4) the disposing and laminating of the nanofiber webs and the second support, which are laminated, on each of both sides of the first support such that the second support comes into contact with the first support will be described.

In the operation (4), the first support and the second support may be melted by applying one or more of heat and pressure and laminated in order to dispose and laminate the nanofiber web and the second support, which are laminated, on each of both sides of the first support. Here, a specific method of applying heat and/or pressure may be selected from well-known methods. As a non-limiting example, a conventional calendering process may be used in which a temperature of applied heat may be 70 to 190° C. Also, when the calendering process is performed, the process may be divided into several operations and be performed a plurality of times. For example, secondary calendering may be performed after primary calendering. Here, degree(s) of heat and/or pressure, which are/is applied in the calendering processes, may be equal or different. The bonding between the second support and the first support through heat fusion may be performed through fusion of the first support and the second support such that an additional adhesive or an adhesive layer may be omitted.

Also, a filter medium 1000 according to a fourth embodiment of the present invention includes, as shown in FIG. 1, a porous first support 130, nanofiber webs 111 and 112 disposed above and below the first support 130 and having a three-dimensional network structure formed by laminating nanofibers including silver nanoparticles and having a plurality of pores, and porous second supports 121 and 122 interposed between the first support 130 and the nanofiber webs 111 and 112, respectively.

Silver nanoparticles are included outside and/or inside the nanofibers which form the nanofiber webs. As a manufacturing method which will be described, the silver nanoparticles provided on the nanofibers are spun on a spinning solution, while silver metallic salt is included, to be included in the nanofibers so as to be more advantageous to preventing separation of the silver nanoparticles in comparison to a case of providing silver nanoparticles on a surface of the manufactured nanofibers through an additional process.

A filter medium formed of only conventional nanofibers may effectively remove fine dust but does not have a means to sterilize microbes, such as bacteria and the like, collected with the fine dust. According to the present invention, since the nanofiber webs 111 and 112 are configured to include silver nanoparticles such that silver nanoparticles are evenly distributed on the surface of the nanofibers, even when an amount of silver which is relatively smaller is used, an excellent antibacterial effect may be provided and problems such as the above-described separation of silver nanoparticles and the like may be solved.

However, to prevent the nanofibers forming the nanofiber webs 111 and 112 from being broken and to maintain strength at a certain degree or higher, an average particle diameter of the nanoparticles included in the nanofiber webs 111 and 112 should be taken into consideration. Accordingly, the average particle diameter of the silver nanoparticles may be 10 to 500 nm. When the average particle diameter of the silver nanoparticles is less than 10 nm, sterilizing ability and antibacterial ability are degraded such that a function of an antibacterial filter may not be performed. When the average particle diameter of the silver nanoparticles exceeds 500 nm, an area of the silver nanoparticles in comparison to a fiber-forming component of the nanofibers increases such that mechanical strength of the nanofibers is degraded, which is disadvantageous in terms of an aspect of durability such as causing the nanofibers to be broken and the like.

Also, since an antibacterial force of the silver nanoparticles is a phenomenon which occurs at an interface between the silver nanoparticles and contaminants, it is necessary that the silver nanoparticles have a certain degree or more of a specific surface area. The specific surface area of the fin silver nanoparticles may be measured through nitrogen vapor adsorption. The specific surface area may be designed in adequate consideration of a desirable filter medium, a desirable silver nanoparticle content, a desirable composition of a solution to be filtered, and the like.

Next, description on a fiber-forming component which forms the nanofiber webs 111 and 112, an average pore diameter, porosity, and an average diameter of the nanofibers are equal to those of the first embodiment of the present invention and as such will be omitted.

Also, description on other components included in the filter medium 1000 are equal to those of the first embodiment of the present invention and as such will be omitted.

Meanwhile, the filter medium 1000 according to the fourth embodiment of the present invention may be manufactured through operations including (1) laminating nanofiber webs including silver nanoparticles with a second support and (2) disposing and laminating the nanofiber webs and the second support, which are laminated, on both sides of a first support such that the second support comes into contact with the first support.

First, as the operation (1) according to the present invention, an operation of laminating the nanofiber webs including silver nanoparticles with the second support is performed.

The nanofiber web may be formed using any method of forming a three-dimensional network-shaped fiber web using nanofibers without limitation. The nanofiber web may be formed by electrospinning a spinning solution, in which metallic salts are dissolved, onto the second support.

The spinning solution may include silver salts, a fiber-forming component, and a solvent. As an example of the fiber-forming component, a fluorine-based compound may be included. 5 to 30 wt %, and preferably, 8 to 20 wt % of the fluorine-based compound may be included in the spinning solution. When the fluorine-based compound is less than 5 wt %, it is difficult to form fibers. When being spun, the fluorine-based compound is not spun in a fiber shape and is sprayed in a droplet state to form a film shape. Otherwise, even when spinning is performed, many beads are formed and the solvent is not well volatilized such that a phenomenon in which pores are blocked during a calendering process which will be described may occur. Also, when the fluorine-based compound exceeds 30 wt %, viscosity increases and solidification occurs on a surface of the solution such that it is difficult to perform spinning for a long time, and a diameter of fibers increases such that it is impossible to form a fiber shape having a size of submicrometer.

The silver salts are a source for providing Ag positive ions and may be one or more types of the silver salts selected from the group consisting of silver nitrate, silver sulfate, silver chloride, and the like. 1 to 20 wt %, and preferably, 5 to 15 wt % of the silver salts may be included. When the silver salts are less than 1 wt %, an antibacterial ability of the silver nanoparticles decreases such that reduction into silver nanoparticles may be difficult. Also, when the silver salts exceed 20 wt %, strength of the nanofibers is degraded such that durability of the filter medium may be degraded. Also, silver ions are precipitated such that a change in color may be caused in which a color thereof changes to brown after drying.

As the solvent, any solvents may be used without limitation that do not generate precipitations while dissolving the silver salts and the fluorine-based compound which is a fiber-forming component and do not influence spinning properties of nanofibers and a diameter of fibers, which will be described below. Preferably, any one or more selected from the group consisting of cyclohexanone, 3-hexanone, 3-heptanone, 3-octanone, N-methylpyrrolidone, dimethylacetamide, acetone dimethyl sulfoxide, and dimethylformamide may be included. As an example, the solvent may be a mixed solvent of dimethylacetamide and acetone.

Meanwhile, description on electrospinning conditions and the like are equal to those of the above-described first embodiment and as such will be omitted.

Silver nanoparticles may be reduced on a surface of the manufactured nanofiber web using one of methods such as emission of ultraviolet (UV) rays or gamma rays, ultrasonic treatment, addition of a reductant, thermal treatment, and the like. In comparison to a method of electrospinning premanufactured silver nanoparticles in a polymer solution, through the above method, an advantage is provided in which small and even silver nanoparticles may be formed in the nanofibers.

Also, the nanofiber web may be formed directly on the second support by electrospinning the nanofibers directly on the above-described second support. The nanofibers accumulated/collected on the second support have a three-dimensional network structure and may be embodied as the nanofiber web having a three-dimensional network structure by further applying heat and/or pressure to the accumulated/ collected nanofibers to retain porosity, an pore diameter, and a basis weight adequate for realizing desirable water permeability and filtration efficiency of a separation membrane. A specific method of applying heat and/or pressure may be selected from well-known methods. As a non-limiting example, a conventional calendering process may be used in which a temperature of applied heat may be 70 to 190° C. Also, when the calendering process is performed, the process may be divided into several operations and performed a plurality of times. For example, a drying process for removing a part or an entirety of a solvent and water remaining on the nanofibers is performed through primary calendering and then secondary calendering may be performed to adjust pores and to improve strength. Here, degree(s) of heat and/or pressure, which are/is applied in the calendering processes, may be equal or different.

When the second support is provided using low melting point composite fibers, bonding between the nanofiber web and the second support through heat fusion may be performed at the same time through the calendering process.

Also, an additional hot-melt powder or hot-melt web may be further interposed to bind the second support to the nanofiber web. Here, a temperature of applied heat may be 60 to 190° C. and an applied pressure may be 0.1 to 10 kgf/cm² but the temperature and pressure are not limited thereto. However, components such as the hot-melt powder, which is separately added for binding, generate fumes or are melted in a process of laminating supports or laminating a support with nanofibers and block pores frequently such that it is impossible to achieve a flow rate of the filter medium which is initially designed. Also, since the components are soluble in a water treatment process such that environmentally adverse problems may be caused, the second support and the nanofiber web may be bound to each other without the components.

Next, before the operation (2) which will be described below, an operation of forming a hydrophilic coating layer by treating the nanofiber web with a hydrophilic coating layer-forming composition may be performed.

However, since the hydrophilic coating layer may be formed on the silver nanoparticles formed on the surface of the nanofibers, coating may be performed within process conditions and a range of having no influence on properties of the silver nanoparticles such as a unique antibacterial property, adhesion, and the like.

In detail, the operation may be performed including treating the nanofiber web with the hydrophilic coating layer-forming composition and forming the hydrophilic coating layer by thermally treating the hydrophilic coating layer-forming composition.

First, the hydrophilic coating layer-forming composition may include a hydrophilic component and a crosslinking component, and for example, include polyvinyl alcohol, a crosslinking agent including a carboxyl group, and a solvent dissolving the same, for example, water. The hydrophilic coating layer-forming composition may include 2 to 20 parts by weight of the crosslinking agent and 1,000 to 100,000 parts by weight of the solvent with respect to 100 parts by weight of polyvinyl alcohol.

Meanwhile, when the nanofibers forming the manufactured nanofiber web include a fluorine-based compound, due to strong hydrophobicity, a coating layer may not be formed on the surface adequately even when being treated using the above-described hydrophilic coating layer-forming composition. Accordingly, the hydrophilic coating layer-forming composition may further include a wettability enhancer to well be wetted in the outer surface of the nanofibers with the hydrophilic coating layer-forming composition.

As the wettability enhancer, any one of components which can improve wettability of the outer surface of the hydrophobic nanofibers with respect to a hydrophilic solution and are soluble in the hydrophilic coating layer-forming composition may be used without limitation. As an example, the wettability enhancer may be one or more components selected from the group consisting of isopropyl alcohol, ethyl alcohol, and methyl alcohol. Also, the wettability enhancer may be included in a range of 1,000 to 100,000 parts by weight with respect to 100 parts by weight of polyvinyl alcohol included in the hydrophilic coating layer-forming composition. When the wettability enhancer is provided at less than 1,000 parts by weight, wettability of the nanofibers is improved insignificantly such that the hydrophilic coating layer may not be easily formed and the hydrophilic coating layer may be frequently delaminated. Also, when the wettability enhancer is provided at more than 100,000 parts by weight, the wettability may be insignificantly improved and concentrations of polyvinyl alcohol and the crosslinking agent included in the hydrophilic coating layer-forming composition are decreased such that the hydrophilic coating layer may not be easily formed.

Meanwhile, the hydrophilic coating layer may be formed by pretreating the nanofiber web with the wettability enhancer and then treating the nanofiber web with the hydrophilic coating layer-forming composition while the hydrophilic coating layer-forming composition does not include the wettability enhancer. However, when the nanofiber web is dipped into the hydrophilic coating layer-forming composition while the wettability enhancer is held by pores, the wettability enhancer held by the pores is discharged from the nanofiber web, and at the same time, time consumed when the hydrophilic coating layer-forming composition penetrates the pores increases such that manufacturing time increases. Also, since a degree of penetration of the hydrophilic coating layer-forming composition varies according to a thickness of the nanofiber web and a diameter of the pores, the hydrophilic coating layer may be non-uniformly formed for each position of the fiber web. In addition, as the hydrophilic coating layer is non-uniformly formed, the pores at a part of the nanofiber web are blocked by the hydrophilic coating layer. In this case, since an initially designed pore structure of the nanofiber web changes, a desirable flow rate may not be obtained. Accordingly, the hydrophilic coating layer-forming composition, which includes the wettability enhancer, is advantageous in reducing a manufacturing time, simplifying a manufacturing process, and improving formability of the hydrophilic coating layer at the same time without change in a pore structure of the nanofiber web.

As a method of forming the above-described hydrophilic coating layer-forming composition on the nanofiber web, any one of well-known coating methods may be employed without limitation. For example, dipping, spraying methods, and the like may be used.

Afterwards, an operation of forming the hydrophilic coating layer by thermally treating the hydrophilic coating layer-forming composition on the nanofiber web may be performed. Through the thermal treatment, a process of drying the solvent among the hydrophilic coating layer-forming composition may be performed at the same time. The thermal treatment may be performed by a dryer. Here, a temperature of applied heat may be 80 to 160° C. and a treatment time may be 1 to 60 minutes, but the temperature and treatment time are not limited thereto.

Next, as the operation (2) according to the present invention, an operation of disposing and laminating the nanofiber webs and the second support, which are laminated, on both sides of the first support such that the second support, which are laminated with the nanofiber webs, comes into contact with the first support is performed.

The operation (2) may be performed through operations including (2-1) laminating the second support and the nanofiber webs which are laminated in the operation (1) on both sides of the first support and (2-2) fusing the first support and the second support by applying any one or more of heat and pressure.

In the operation (2-2), a specific method of applying heat and/or pressure may be selected from well-known methods. As a non-limiting example, a conventional calendering process may be used in which a temperature of applied heat may be 70 to 190° C. Also, when the calendering process is performed, the process may be divided into several operations and be performed a plurality of times. For example, secondary calendering may be performed after primary calendering. Here, degree(s) of heat and/or pressure, which are/is applied in the calendering processes, may be equal or different. Bonding between the second support and the first support through heat fusion may be performed through the operation (2-2) such that an additional adhesive or an adhesive layer may be omitted.

Meanwhile, the present invention provides a flat filter unit which includes a filter medium manufactured using the above-described manufacturing method.

Figure 5A:
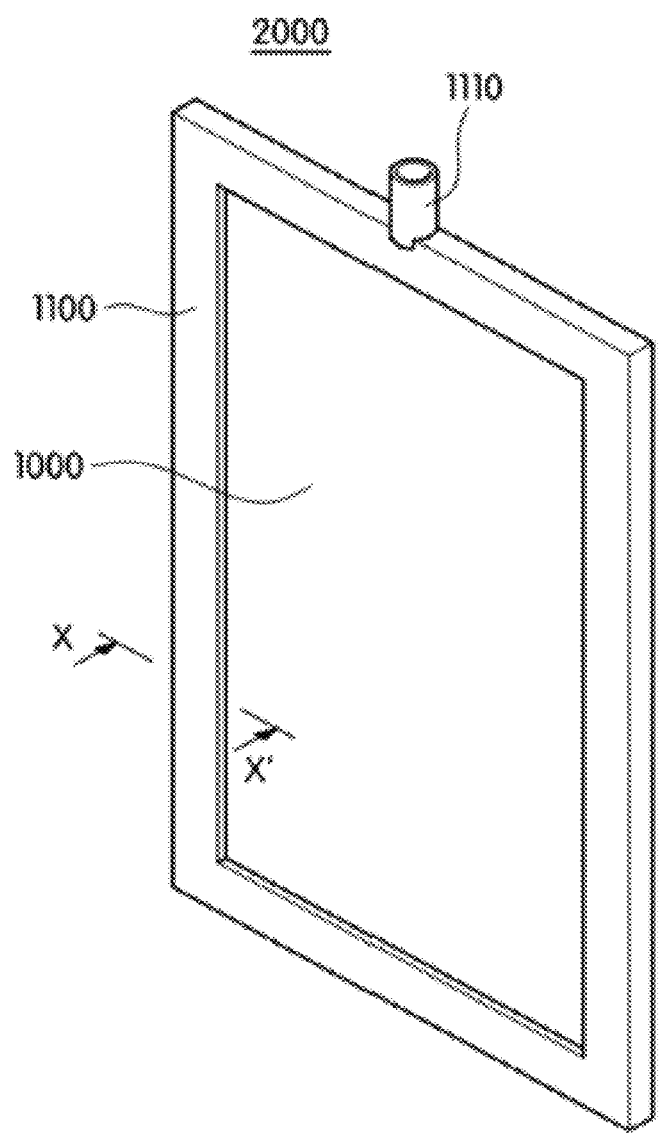
FIG. 5A is a perspective view of the filter unit.
Figure 5B:
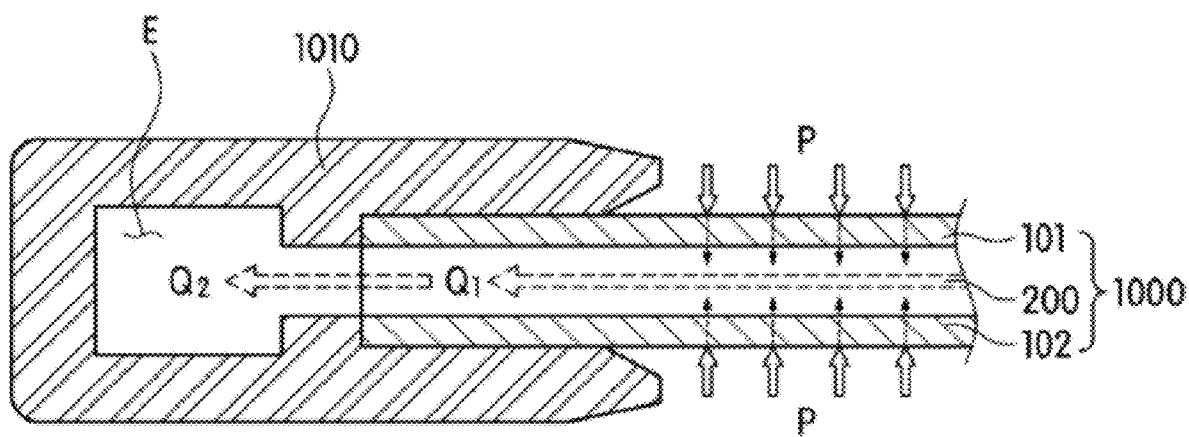
FIG. 5B is a schematic diagram illustrating a filtration flow on the basis of a cross-sectional view taken along a line X-X' of FIG. 5A.

As shown in FIG. 5A, the filter medium 1000 may be embodied as a flat filter unit 2000. In detail, the flat filter unit 2000 includes the filter medium 1000 and a support frame 1100 which includes a flow path for discharging a filtrate filtered by the filter medium 1000 to the outside and supports an edge of the filter medium 1000.

Also, an inlet port 1110 which forms a pressure difference (grain) between the outside and the inside of the filter medium 1000 may be provided in any one area of the support frame 1100. Also, a flow path, through which the filtrate filtered by the nanofiber webs passes through a support in which the second support and the first support are laminated in the filter medium 1000 and is discharged to the outside, may be formed in the support frame 1100.

In more detail, in the filter unit 2000 as shown in FIG. 5A, when a suction force at high pressure is applied through the inlet port 1110, a solution P which is to be filtered, which is disposed outside the filter medium 1000, may move toward the inside of the filter medium 1000, a filtrate Q1 filtered through nanofiber webs 101 and 102, may flow along a flow path formed through a support 200, in which the second support and the first support are laminated, and may flow into a flow path E provided outside the support frame 1100, and an inflow filtrate Q2 may be discharged to the outside through the inlet port 1110.

Also, the flat filter unit 2000 as shown in FIG. 5A may embody a filter module in which a plurality of such flat filter units are spaced at certain intervals apart in one external case. Also, a plurality of such filter modules may be laminated/blocked to form a large water treatment apparatus.

In the filter medium according to the present invention, deformation and damage to a shape and a structure of the filter medium may be minimized and a flow path may be easily secured so as to have a high flow rate in a water treatment operation. Also, despite high pressure applied in backwashing, an extending use period is provided due to excellent durability of the filter medium, excellent water permeability and chemical resistance are provided by uniformly coating a surface thereof with hydrophilic components, contamination is easily controlled, and filtration performance with respect to contaminants having positive ions such as a cationic compound and the like is excellent such that the filter medium is variously applicable to a variety of water treatment fields.

MODES OF THE INVENTION

Although the following embodiments of the present invention will be described in more detail, the following embodiments do not limit the scope of the present invention and should be construed as aiding in understanding of the present invention.

Example 1

(1) Manufacturing of Hydrophilic Coating Composition

As a first solvent, a mixture solution was prepared by dissolving 10 g of polyvinyl alcohol (Kuraray Co., Ltd, PVA217) having 1,800 degrees of polymerization and 88% degrees of saponification as a hydrophilic polymer compound in 500 g of ultrapure water at a temperature of 80° C. for six hours using a magnetic bar, and a first solution was prepared by cooling the mixture solution at room temperature, mixing with 1.5 g of sulfosuccinic acid (Aldrich, SSA) as a first crosslinking agent, and dissolving at room temperature for twelve hours.

As a second solvent, a second solution was prepared by dissolving 10 g of poly(styrene sulfonic acid-co-maleic acid) in 500 g of ultrapure water as a second crosslinking agent at room temperature for six hours using a magnetic bar. Afterwards, a coating solution was prepared by mixing and dissolving the first solution and the second solution for twelve hours. Afterwards, a hydrophilic coating composition was manufactured by adding and mixing 500 g of isopropyl alcohol (Duksan Scientific Corp, IPA), as a wettability enhancer, in the coating solution, like a weight ratio of the ultrapure water, for two hours.

(2) Manufacturing of Filter Medium

To prepare a spinning solution, a mixture solution was prepared by dissolving 12 g of polyvinylidene fluoride (Arkema Co., Ltd, Kynar761), as a fiber-forming component, in 88 g of a mixed solvent, in which dimethylacetamide and acetone are mixed at a weight ratio of 70:30, at a temperature of 80° C. for six hours using a magnetic bar. The spinning solution was injected into a solution tank of an electrospinning device and was discharged at a speed of 15 µl/min/hole. Here, in a spinning section, a temperature of 30° C., a humidity of 50%, and 20 cm of a distance between a collector and a spinning nozzle tip were maintained. Afterwards, a fiber web formed of PVDF nanofibers was manufactured by applying a voltage of 40 kV or higher to a spinning nozzle pack using a high voltage generator simultaneously while applying an air pressure of 0.03 MPa per a nozzle of the spinning nozzle pack. Also, a laminate was manufactured by disposing non-woven fabric (NamYang Nonwoven Fabric Co., Ltd, CCP40) formed of low melting point composite fiber having an average thickness of 200 µm and a melting point of 120° C. and including a sheath portion formed of polyethylene and a core portion of polypropylene, as a second support, on one surface of the nanofiber web, and then laminating the second support with the nanofiber web by performing a calendering process by applying heat and pressure of a temperature of 140° C. and 1 kgf/cm².

Afterwards, the manufactured lamination was impregnated with the manufactured hydrophilic coating composition through a dipping process and then dried in a dryer at a temperature of 100° C. for five minutes. A curing reaction was performed with drying such that a hydrophilic coating layer was formed on the lamination.

Also, the hydrophilic coating layer formed on the second support was removed through cleaning using 5 L of pure water, and two pieces of the lamination, from which the hydrophilic coating layer formed on the second support is removed, were disposed on both sides of a first support such that the second support comes into contact with the first support. Here, as the first support, non-woven fabric (NamYang Nonwoven Fabric Co., Ltd, NP450) formed of low melting point composite fiber having an average thickness of 5 mm and a melting point of about 120° C. and including a sheath portion of polyethylene and a core portion of polypropylene was used. Afterwards, a filter medium was manufactured by applying heat at a temperature of 140° C. and a pressure of 1 kgf/cm$^2$.

Examples 2 to 18 and Comparative Examples 1 to 3

Filter media were manufactured by performing the same as in Example 1 while a degree of polymerization and a degree of saponification of a hydrophilic polymer compound and a crosslinking agent content, a weight rate between crosslinking agents, a wettability enhancer content, and the like were changed as shown in following Tables 1 to 4.

Experimental Example

Each of filter media manufactured according to examples and comparative examples was embodied as a filter unit as shown in FIG. 5A, and the following properties were evaluated and shown in Tables 1 to 4.

1. Measurement of Relative Water Permeability

With respect to filter units embodied using the filter media manufactured according to the examples and comparative examples, water permeability per 0.5 m$^2$ of an area of a specimen was measured by applying a driving pressure of 50 kPa, and then water permeability of each of filter media according to other examples and comparative examples was measured on the basis of water permeability of the filter medium of Example 1 as 100 as a reference.

2. Evaluation of Filtration Efficiency of Positive Ions

With respect to the filter units embodied using filter media manufactured according to the examples and comparative examples, filtration efficiency with respect to Na+ was measured through ion chromatography analysis.

3. Evaluation of Durability Against Backwashing

With respect to the filter units embodied using the filter media manufactured according to the examples and comparative examples, backwashing was performed under conditions in which the filter unit was immersed into water and then water (400 LMH) was pressurized for two minutes per 0.5 m$^2$ of an area of a specimen by applying a driving pressure of 50 kPa. Then, durability against backwashing was evaluated. A case in which no abnormalities occur is O and a case in which any problems such as delamination of a silver antibacterial layer, delamination between layers, and the like occur is X.

4. Evaluation of Filtration Efficiency of Positive Ions after Backwashing

With respect to the filter units embodied using filter media manufactured according to the examples and comparative examples, after performing the backwashing, filtration efficiency with respect to Na+ was measured through ion chromatography analysis.

TABLE 1

| Classification | | | Example 1 | Example 2 | Example 3 | Example 4 | Example 5 | Example 6 |
|---|---|---|---|---|---|---|---|---|
| Hydrophilic coating composition | PVA | Degree of polymerization | 1800 | 300 | 1500 | 2500 | 1800 | 1800 |
| | | Degree of saponification (%) | 88 | 88 | 88 | 88 | 83 | 86 |
| | Crosslinking agent | Content (part(s) by weight) | 115 | 115 | 115 | 115 | 115 | 115 |
| | | Weight ratio between first and second crosslinking agents | 1:6.7 | 1:6.7 | 1:6.7 | 1:6.7 | 1:6.7 | 1:6.7 |
| | Wettability enhancer | Content (part(s) by weight) | 5000 | 5000 | 5000 | 5000 | 5000 | 5000 |
| Whether first support is included | | | O | O | O | O | O | O |
| Whether second support is included | | | O | O | O | O | O | O |
| Relative water permeability (%) | | | 100 | 105 | 102 | 74 | 104 | 101 |
| Positive ion filtration efficiency (%) | | | 95 | 86 | 94 | 97 | 84 | 94 |
| Durability against backwashing | | | O | X | O | O | X | O |
| Positive ion filtration efficiency (%) | | | 95 | 69 | 94 | 96 | 66 | 94 |

TABLE 2

| Classification | | | Example 7 | Example 8 | Example 9 | Example 10 | Example 11 | Example 12 |
|---|---|---|---|---|---|---|---|---|
| Hydrophilic coating composition | PVA | Degree of polymerization | 1800 | 1800 | 1800 | 1800 | 1800 | 1800 |
| | | Degree of saponification (%) | 89 | 92 | 88 | 88 | 88 | 88 |
| | Crosslinking agent | Content (part(s) by weight) | 115 | 115 | 70 | 90 | 140 | 160 |

TABLE 2-continued

| Classification | | | Example 7 | Example 8 | Example 9 | Example 10 | Example 11 | Example 12 |
|---|---|---|---|---|---|---|---|---|
| | | Weight ratio between first and second crosslinking agents | 1:6.7 | 1:6.7 | 1:6.7 | 1:6.7 | 1:6.7 | 1:6.7 |
| | Wettability enhancer | Content (part(s) by weight) | 5000 | 5000 | 5000 | 5000 | 5000 | 5000 |
| Whether first support is included | | | ○ | ○ | ○ | ○ | ○ | ○ |
| Whether second support is included | | | ○ | ○ | ○ | ○ | ○ | ○ |
| Relative water permeability (%) | | | 99 | — | 107 | 103 | 91 | 72 |
| Positive ion filtration efficiency (%) | | | 96 | — | 87 | 93 | 96 | 97 |
| Durability against backwashing | | | ○ | — | X | ○ | ○ | ○ |
| Positive ion filtration efficiency (%) after backwashing | | | 96 | — | 63 | 93 | 96 | 97 |

TABLE 3

| Classification | | | Example 13 | Example 14 | Example 15 | Example 16 | Example 17 | Example 18 |
|---|---|---|---|---|---|---|---|---|
| Hydrophilic coating composition | PVA | Degree of polymerization | 1800 | 1800 | 1800 | 1800 | 1800 | 1800 |
| | | Degree of saponification (%) | 88 | 88 | 88 | 88 | 88 | 88 |
| | Crosslinking agent | Content (part(s) by weight) | 115 | 115 | 115 | 115 | 115 | 115 |
| | | Weight ratio between first and second crosslinking agents | 1:1 | 1:5 | 1:8 | 1:12 | 1:6.7 | 1:6.7 |
| | Wettability enhancer | Content (part(s) by weight) | 5000 | 5000 | 5000 | 5000 | 500 | 25000 |
| Whether first support is included | | | ○ | ○ | ○ | ○ | ○ | ○ |
| Whether second support is included | | | ○ | ○ | ○ | ○ | ○ | ○ |
| Relative water permeability (%) | | | 86 | 92 | 83 | 75 | 73 | 83 |
| Positive ion filtration efficiency (%) | | | 84 | 91 | 96 | 98 | 93 | 78 |
| Durability against backwashing | | | ○ | ○ | ○ | ○ | ○ | X |
| Positive ion filtration efficiency (%) after backwashing | | | 84 | 91 | 96 | 98 | 93 | 61 |

TABLE 4

| Classification | | | Comparative Example 1 | Comparative Example 2 | Comparative Example 3 |
|---|---|---|---|---|---|
| Hydrophilic coating composition | PVA | Degree of polymerization | — | 1800 | 1800 |
| | | Degree of saponification (%) | — | 88 | 88 |
| | Crosslinking agent | Content (part(s) by weight) | — | 115 | 115 |
| | | Weight ratio between first and second crosslinking agents | — | 1:6.7 | 1:6.7 |
| | Wettability enhancer | Content (part(s) by weight) | — | 5000 | 5000 |
| Whether first support is included | | | ○ | ○ | X |
| Whether second support is included | | | ○ | X | ○ |
| Relative water permeability (%) | | | 22 | 118 | 112 |
| Positive ion filtration efficiency (%) | | | 11 | 86 | 83 |
| Durability against backwashing | | | ○ | X | X |
| Positive ion filtration efficiency (%) after backwashing | | | 10 | 51 | 39 |

As seen in Tables 1 to 4, Examples 1, 3, 6, 7, 10, 11, 14, and 15, which satisfied all of a degree of polymerization and a degree of saponification of a hydrophilic polymer compound, a crosslinking agent content, a weight ratio between crosslinking agents, a wettability enhancer content, and the like according to the present invention, were excellent in water permeability, filtration efficiency, durability against backwashing, filtration efficiency after the backwashing in comparison to Examples 2, 4, 5, 8, 9, 12, 13, 16 to 18 and comparative Examples 1 to 3, in which even any one among such factors was omitted.

Meanwhile, since a degree of saponification is excessive such that a coating layer is not formed in Example 8, it is impossible to measure properties thereof

Example 19

First, to prepare a spinning solution, a mixture solution was prepared by dissolving 12 g of polyvinylidene fluoride (Arkema Co., Ltd, Kynar761), as a fiber-forming component, in 88 g of a mixed solvent, in which dimethylacetamide and acetone were mixed at a weight ratio of 70:30, at a temperature of 80° C. for six hours using a magnetic bar. The spinning solution was injected into a solution tank of an electrospinning device and was discharged at a speed of 15 µl/min/hole. Here, in a spinning section, a temperature of 30° C., a humidity of 50%, and 20 cm of a distance between a collector and a spinning nozzle tip were maintained. Afterwards, a fiber web formed of PVDF nanofibers was manufactured by applying a voltage of 40 kV or higher to a spinning nozzle pack using a high voltage generator simultaneously while applying an air pressure of 0.03 MPa per a nozzle of the spinning nozzle pack. Also, to form a hydrophilic coating layer on an outer surface of nanofibers, a first mixture solution was prepared by dissolving 7143 parts by weight of pure water, as a solvent, with respect to 100 parts by weight of polyvinyl alcohol (Kuraray Co., Ltd, PVA217), as a hydrophilic polymer, at a temperature of 80° C. for six hours using a magnetic bar. A second mixture solution was prepared by lowering a temperature of the first mixture solution to room temperature and then mixing and dissolving 15 parts by weight of poly(acrylic acid-maleic acid) (Aldrich, PAM), with respect to 100 parts by weight of the hydrophilic polymer, with the first mixture solution at room temperature for twelve hours. Also, a hydrophilic coating solution was prepared by adding and mixing 7143 parts by weight of isopropyl alcohol (Duksan Scientific Corp, IPA), with respect to 100 parts by weight of the hydrophilic polymer, with the second solution for two hours. Afterwards, a hydrophilic coating layer was formed on an outer surface of nanofibers by dipping a fiber web into the manufactured hydrophilic coating solution and drying the same at a temperature of 110° C. for five minutes.

Also, a nanofiber web, which has 0.8 µm of an average pore diameter and a porosity of 70%, was manufactured by cleaning the fiber web, forming a primer layer by applying and drying toluene to the cleaned fiber web, and forming a silver antibacterial layer having an average thickness of 50 nm by vapor-depositing silver through a resistance heating vacuum evaporation. Here, a weight of the silver antibacterial layer provided on the nanofiber web is 60% in comparison to a weight of an entirety of the nanofibers. Afterwards, non-woven fabric (NamYang Nonwoven Fabric Co., Ltd, CCP40) formed of low melting point composite fiber having an average thickness of 200 µm and a melting point of 120° C. and including a sheath portion formed of polyethylene and a core portion of polypropylene, was disposed, as a second support, on one surface of the nanofiber web, and then the second support and the nanofiber web were laminated by performing a calendering process by applying heat and pressure of a temperature of 140° C. and 1 kgf/cm².

Also, two lamination products formed by laminating the second support and the nanofiber web were disposed on both sides of the first support to allow the second supports to come into contact with the first support. Here, as the first support, non-woven fabric (NamYang Nonwoven Fabric Co., Ltd, NP450) formed of low melting point composite fiber having an average thickness of 5 mm and a melting point of about 120° C. and including a sheath portion of polyethylene and a core portion of polypropylene was used. Afterwards, a filter medium was manufactured by applying heat at a temperature of 140° C. and a pressure of 1 kgf/cm².

Example 20

A filter medium was manufactured in the same manner as in Example 19 except that a fiber web formed of PVDF nanofibers was manufactured, cleaning and forming a primer layer was changed to etching of nanofibers, and vapor-deposition was changed to electroless plating performed by dipping the manufactured fiber web into a silver plating solution including hydrazine and silver nitrate for five hours.

Examples 21 to 26 and Comparative Examples 4 to 6

Filter media shown in following Tables 5 and 6 were manufactured in the same manner as in Example 19 while a thickness of a silver antibacterial layer, a weight of the silver antibacterial layer with respect to a weight of nanofibers, an average pore diameter and porosity of a nanofiber web, a first support, a second support, and whether the silver antibacterial layer was included were changed as shown in Tables 5 and 6.

Experimental Example 2

Each of filter media manufactured according to examples and comparative examples was embodied as a filter unit as shown in FIG. 4A, and the following properties were evaluated and shown in Tables 5 and 6.

1. Measurement of Relative Water Permeability

With respect to filter units embodied using the filter media manufactured according to the examples and comparative examples, water permeability per 0.5 m² of an area of a specimen was measured by applying a driving pressure of 50 kPa, and then water permeability of each of filter media according to other examples and comparative examples was measured on the basis of water permeability of the filter medium of Example 19 as 100 as a reference.

2. Measurement of Antibacterial Property

With respect to filter units embodied using filter media manufactured according to examples and comparative examples, antibacterial properties were manufactured on the basis of KS K 0693: 2011, and bacteriostatic reduction rates with respect to *Staphylococcus aureus* (ATCC 6538) and *Klebsiella pneumoniae* (ATCC 4352), as publicly announced used strains, were measured.

3. Evaluation of Durability Against Backwashing

With respect to the filter units embodied using the filter media manufactured according to the examples and comparative examples, backwashing was performed under conditions in which the filter unit was immersed into water and then water (400 LMH) was pressurized for two minutes per 0.5 m² of an area of a specimen by applying a driving pressure of 50 kPa. Then, durability against backwashing was evaluated. A case in which no abnormalities occur is O and a case in which any problems such as delamination of a silver antibacterial layer, delamination between layers, and the like occur is X.

4. Measurement of Antibacterial Property after Backwashing

With respect to filter units embodied using filter media manufactured according to examples and comparative examples, antibacterial properties were manufactured, after performing the backwashing, on the basis of KS K 0693: 2011, and bacteriostatic reduction rates with respect to *Staphylococcus aureus* (ATCC 6538) and *Klebsiella pneumoniae* (ATCC 4352), as publicly announced used strains, were measured after the backwashing.

TABLE 5

| Classification | | Example 19 | Example 20 | Example 21 | Example 22 | Example 23 | Example 24 |
|---|---|---|---|---|---|---|---|
| Method of forming silver antibacterial layer forming method | | Vapor deposition | Plating | Plating | Plating | Plating | Plating |
| Thickness of silver antibacterial layer (nm) | | 50 | 50 | 2 | 10 | 100 | 150 |
| Weight of silver antibacterial layer in comparison to weight of nanofibers (%) | | 60 | 133 | 12 | 88 | 189 | 276 |
| Average pore diameter of nanofiber web (μm) | | 0.8 | 0.75 | 1.5 | 1.1 | 0.53 | 0.28 |
| Porosity of nanofiber web (%) | | 70 | 67 | 82 | 77 | 58 | 53 |
| Whether first support is included | | ○ | ○ | ○ | ○ | ○ | ○ |
| Whether second support is included | | ○ | ○ | ○ | ○ | ○ | ○ |
| Relative water permeability (%) | | 100 | 98 | 133 | 105 | 82 | 54 |
| Bacteriostatic reduction rate (antibacterial property) | Staphylococcus (%) | 99.9 | 99.9 | 99.9 | 99.9 | 99.9 | 99.9 |
| | Pneumonia bacilli (%) | 99.9 | 99.9 | 99.9 | 99.9 | 99.9 | 99.9 |
| Durability against backwashing | | ○ | ○ | X | ○ | ○ | ○ |
| Bacteriostatic reduction rate (antibacterial property) after backwashing | Staphylococcus (%) | 99.9 | 99.9 | 78.2 | 97.7 | 99.9 | 99.9 |
| | Pneumonia bacilli (%) | 99.9 | 99.9 | 81.7 | 98.2 | 99.9 | 99.9 |

TABLE 6

| Classification | | Example 25 | Example 26 | Comparative Example 4 | Comparative Example 5 | Comparative Example 6 |
|---|---|---|---|---|---|---|
| Method of forming silver antibacterial layer forming method | | Vapor deposition | Plating | — | Plating | Plating |
| Thickness of silver antibacterial layer (nm) | | 5 | 280 | — | 50 | 50 |
| Weight of silver antibacterial layer in comparison to weight of nanofibers (%) | | 10 | 550 | — | 30 | 30 |
| Average pore diameter of nanofiber web (μm) | | 1.5 | 0.12 | 1 | 1 | 1 |
| Porosity of nanofiber web (%) | | 85 | 43 | 70 | 70 | 70 |
| Whether first support is included | | ○ | ○ | ○ | ○ | X |
| Whether second support is included | | ○ | ○ | ○ | X | ○ |
| Relative water permeability (%) | | 141 | 37 | 100 | 117 | 110 |
| Bacteriostatic reduction rate (antibacterial property) | Staphylococcus (%) | 99.9 | 99.9 | 0 | 99.9 | 99.9 |
| | Pneumonia bacilli (%) | 99.9 | 99.9 | 0 | 99.9 | 99.9 |
| Durability against backwashing | | X | ○ | ○ | X | X |
| Bacteriostatic reduction rate (antibacterial property) after backwashing | Staphylococcus (%) | 86.7 | 99.9 | 0 | 72 | 54.2 |
| | Pneumonia bacilli (%) | 85.1 | 99.9 | 0 | 67.9 | 48.8 |

As shown in Tables 5 and 6, Examples 19, 20, 22, and 23, which satisfied a thickness of a silver antibacterial layer, a weight of the silver antibacterial layer in comparison to a weight of nanofibers, an average pore diameter and porosity of a nanofiber web, a first support, a second support, and whether the silver antibacterial layer was included, and the like according to the present invention, were excellent in all of water permeability, a bacteriostatic reduction rate (antibacterial property), durability against backwashing, and a bacteriostatic reduction rate (antibacterial property) after backwashing in comparison to Examples 21, 24, 25, and 26 and Comparative Examples 4 to 6 in which even any one among such factors was omitted.

Example 27

First, to prepare a spinning solution, a mixture solution was prepared by dissolving 12 g of polyvinylidene fluoride (Arkema Co., Ltd, Kynar761), as a fiber-forming component, in 88 g of a mixed solvent, in which dimethylacetamide and acetone were mixed at a weight ratio of 70:30, at a temperature of 80° C. for six hours using a magnetic bar. The spinning solution was injected into a solution tank of an electrospinning device and was discharged at a speed of 15 μl/min/hole. Here, in a spinning section, a temperature of 30° C., a humidity of 50%, and 20 cm of a distance between a collector and a spinning nozzle tip were maintained. Afterwards, a fiber web formed of PVDF nanofibers having an average diameter of 250 nm was manufactured by applying a voltage of 40 kV or higher to a spinning nozzle pack using a high voltage generator simultaneously while applying an air pressure of 0.03 MPa per a nozzle of the spinning nozzle pack.

Also, to form a hydrophilic coating layer on an outer surface of nanofibers, a first mixture solution was prepared by dissolving 7143 parts by weight of pure water, as a solvent, with respect to 100 parts by weight of polyvinyl alcohol (Kuraray Co., Ltd, PVA217), as a hydrophilic polymer, at a temperature of 80° C. for six hours using a magnetic bar. A second mixture solution was prepared by lowering a temperature of the first mixture solution to room temperature and then mixing and dissolving 15 parts by weight of poly(acrylic acid-maleic acid) (Aldrich, PAM), with respect to 100 parts by weight of the hydrophilic polymer, with the first mixture solution at room temperature for twelve hours. Also, a hydrophilic coating solution was prepared by adding and mixing 7143 parts by weight of isopropyl alcohol (Duksan Scientific Corp, IPA), with respect to 100 parts by weight of the hydrophilic polymer, with the second solution for two hours. Afterwards, a hydrophilic coating layer was formed on an outer surface of nanofibers by dipping a fiber web into the manufactured hydrophilic coating solution and drying the same at a temperature of 110° C. for five minutes. Here, an average thickness of the hydrophilic coating layer was 30 nm.

Afterwards, to form a positively charged coating layer on the fiber web on which the hydrophilic coating layer is formed, a positively charged coating solution was prepared by mixing 100 parts by weight of pure water as a solvent with 0.5 part by weight of polyethylene imide as a positively charged compound, and with 0.1 parts by weight of polyvinyl alcohol and poly(acrylic acid-maleic acid) at a weight ratio of 10:1 as a binder. A nanofiber web, on which the positively charged coating layer is formed and which has an average pore diameter of 0.3 μm and a porosity of 45%, was manufactured by dipping the fiber web, on which the hydrophilic coating layer is formed, into the positively charged coating solution and drying the dipped fiber web at a temperature 110° C. for 10 minutes. Here, an average thickness of the positively charged coating layer was 30 nm. Afterwards, non-woven fabric (NamYang Nonwoven Fabric Co., Ltd, CCP40) formed of low melting point composite fiber having an average thickness of 200 μm and a melting point of 120° C. and including a sheath portion formed of polyethylene and a core portion of polypropylene, was disposed, as a second support, on one surface of the nanofiber web, and then the second support and the nanofiber web were laminated by performing a calendering process by applying heat and pressure of a temperature of 140° C. and 1 kgf/cm$^2$.

Also, two lamination products formed by laminating the second support and the nanofiber web were disposed on both sides of the first support to allow the second supports to come into contact with the first support. Here, as the first support, non-woven fabric (NamYang Nonwoven Fabric Co., Ltd, NP450) formed of low melting point composite fiber having an average thickness of 5 mm and a melting point of about 120° C. and including a sheath portion of polyethylene and a core portion of polypropylene was used. Afterwards, a filter medium was manufactured by applying heat at a temperature of 140° C. and a pressure of 1 kgf/cm$^2$.

Example 28

First, to prepare a spinning solution, a mixture solution was prepared by dissolving 12 g of polyvinylidene fluoride (Arkema Co., Ltd, Kynar761), as a fiber-forming component, in 88 g of a mixed solvent, in which dimethylacetamide and acetone were mixed at a weight ratio of 70:30, at a temperature of 80° C. for six hours using a magnetic bar. The spinning solution was injected into a solution tank of an electrospinning device and was discharged at a speed of 15 μl/min/hole. Here, in a spinning section, a temperature of 30° C., a humidity of 50%, and 20 cm of a distance between a collector and a spinning nozzle tip were maintained. Afterwards, a fiber web formed of polyvinylidene fluoride (PVDF) nanofibers was manufactured by applying a voltage of 40 kV or higher to a spinning nozzle pack using a high voltage generator simultaneously while applying an air pressure of 0.03 MPa per a nozzle of the spinning nozzle pack. Also, a nanofiber web, which has 0.3 μm of an average pore diameter and a porosity of 45%, was manufactured by cleaning the fiber web, forming a primer layer by applying and drying toluene to the cleaned fiber web, and forming a positively charged coating layer having an average thickness of 50 nm by vapor-depositing silver through a resistance heating vacuum evaporation. Here, a weight of the silver antibacterial layer provided on the nanofiber web is 30% in comparison to a weight of an entirety of the nanofibers. Afterwards, non-woven fabric (NamYang Nonwoven Fabric Co., Ltd, CCP40) formed of low melting point composite fiber having an average thickness of 200 μm and a melting point of 120° C. and including a sheath portion formed of polyethylene and a core portion of polypropylene, was disposed, as a second support, on one surface of the nanofiber web, and then the second support and the nanofiber web were laminated by performing a calendering process by applying heat and pressure of a temperature of 140° C. and 1 kgf/cm$^2$.

Also, two lamination products formed by laminating the second support and the nanofiber web were disposed on both sides of the first support to allow the second supports to come into contact with the first support. Here, as the first support, non-woven fabric (NamYang Nonwoven Fabric Co., Ltd, NP450) formed of low melting point composite fiber having an average thickness of 5 mm and a melting point of about 120° C. and including a sheath portion of polyethylene and a core portion of polypropylene was used. Afterwards, a filter medium was manufactured by applying heat at a temperature of 140° C. and a pressure of 1 kgf/cm$^2$.

Example 29

A filter medium was manufactured in the same manner as in Example 28 except that a fiber web formed of PVDF nanofibers was manufactured, cleaning and forming a primer layer was changed to etching of nanofibers, vapor-deposition was changed to electroless plating performed by dipping the manufactured fiber web into a silver plating solution including hydrazine and silver nitrate for five hours.

Examples 30 to 41 and Comparative Examples 7 to 9

Filter media shown in the following Tables 7 to 9 were manufactured in the same manner as in Example 27 while a thickness of a positively charged coating layer, a weight ratio between a positively charged compound and a binder, a thickness of a hydrophilic coating layer, an average pore diameter and porosity of a nanofiber web, a first support, a second support, and whether the positively charged coating layer was included were changed as shown in Tables 7 to 9.

Experimental Example 3

Each of filter media manufactured according to examples and comparative examples was embodied as in the filter unit as shown in FIG. 5A, and the following properties were evaluated and shown in Tables 7 to 9.

1. Measurement of Relative Water Permeability

With respect to filter units embodied using the filter media manufactured according to the examples and comparative examples, water permeability per 0.5 m² of an area of a specimen was measured by applying a driving pressure of 50 kPa, and then water permeability of each of filter media according to other examples and comparative examples was measured on the basis of water permeability of the filter medium of Example 27 as 100 as a reference.

2. Measurement of Zeta Potential

With respect to filter units embodied using filter media manufactured according to examples and comparative examples, zeta potential, on the basis of a pH of 7, was measured using a zeta potential measurer (SurPASS 3, Anton Paar) capable of measuring a zeta potential of a surface.

3. Evaluation of Filtration Efficiency of Negative Ions

With respect to the filter units embodied using filter media manufactured according to the examples and comparative examples, filtration efficiency with respect to negative ions (Cl−) was measured through ion chromatography analysis.

4. Evaluation of Durability Against Backwashing

With respect to the filter units embodied using the filter media manufactured according to the examples and comparative examples, backwashing was performed under conditions in which the filter unit was immersed into water and then water (400 LMH) was pressurized for two minutes per 0.5 m² of an area of a specimen by applying a driving pressure of 50 kPa. Then, durability against backwashing was evaluated. A case in which no abnormalities occur is O and a case in which any problems such as delamination of a silver antibacterial layer, delamination between layers, and the like occur is X.

5. Evaluation of Filtration Efficiency of Negative Ions after Backwashing

With respect to the filter units embodied using filter media manufactured according to the examples and comparative examples, after performing the backwashing, filtration efficiency with respect to negative ions (Cl−) was measured through ion chromatography analysis.

TABLE 7

| Classification | | Example 27 | Example 28 | Example 29 | Example 30 | Example 31 | Example 32 |
|---|---|---|---|---|---|---|---|
| Positively charged coating layer | Forming method | Coating | Plating | Vapor deposition | Coating | Coating | Coating |
| | Thickness (nm) | 30 | 30 | 30 | 2.5 | 20 | 45 |
| | Thickness in comparison to average diameter of nanofibers (%) | 12 | 12 | 12 | 1 | 8 | 18 |
| | Weight ratio between positively charged compound and binder | 1:0.2 | — | — | 1:0.2 | 1:0.2 | 1:0.2 |
| Hydrophilic coating layer | Thickness (nm) | 30 | 30 | 30 | 30 | 30 | 30 |
| | Thickness in comparison to average diameter of nanofibers (%) | 12 | 12 | 12 | 12 | 12 | 12 |
| Nanofiber web | Average pore diameter (μm) | 0.3 | 0.3 | 0.3 | 0.4 | 0.3 | 0.2 |
| | Porosity (%) | 45 | 45 | 45 | 57 | 47 | 42 |
| Whether first support is included | | ○ | ○ | ○ | ○ | ○ | ○ |
| Whether second support is included | | ○ | ○ | ○ | ○ | ○ | ○ |
| Relative water permeability (%) | | 100 | 97 | 98 | 105 | 103 | 93 |
| Zeta potential | | 23 | 36 | 33 | 12 | 21 | 33 |
| Negative ion filtration efficiency (%) | | 95 | 99 | 93 | 73 | 92 | 95 |
| Durability against backwashing | | ○ | ○ | ○ | X | ○ | ○o |
| Negative ion filtration efficiency after backwashing (%) | | 95 | 97 | 92 | 62 | 92 | 94 |

TABLE 8

| Classification | | Example 33 | Example 34 | Example 35 | Example 36 | Example 37 | Example 38 |
|---|---|---|---|---|---|---|---|
| Positively charged coating layer | Forming method | Coating | Coating | Coating | Coating | Coating | Coating |
| | Thickness (nm) | 62.5 | 30 | 30 | 30 | 30 | 30 |
| | Thickness in comparison to average diameter of nanofibers (%) | 25 | 12 | 12 | 12 | 12 | 12 |
| | Weight ratio between positively charged compound and binder | 1:0.2 | 1:0.01 | 1:0.06 | 1:0.9 | 1:2 | 1:0.2 |
| Hydrophilic coating layer | Thickness (nm) | 30 | 30 | 30 | 30 | 30 | 2.5 |
| | Thickness in comparison to average diameter of nanofibers (%) | 12 | 12 | 12 | 12 | 12 | 1 |

TABLE 8-continued

| Classification | | Example 33 | Example 34 | Example 35 | Example 36 | Example 37 | Example 38 |
|---|---|---|---|---|---|---|---|
| Nanofiber web | Average pore diameter (μm) | 0.15 | 0.3 | 0.3 | 0.28 | 0.22 | 0.5 |
| | Porosity (%) | 35 | 45 | 45 | 44 | 42 | 62 |
| Whether first support is included | | ○ | ○ | ○ | ○ | ○ | ○ |
| Whether second support is included | | ○ | ○ | ○ | ○ | ○ | ○ |
| Relative water permeability (%) | | 77 | 99 | 98 | 97 | 95 | 71 |
| Zeta potential | | 37 | 30 | 28 | 21 | 12 | 24 |
| Negative ion filtration efficiency (%) | | 98 | 95 | 95 | 94 | 74 | 94 |
| Durability against backwashing | | ○ | X | ○ | ○ | ○ | X |
| Negative ion filtration efficiency after backwashing (%) | | 97 | 72 | 93 | 94 | 74 | 70 |

TABLE 9

| Classification | | Example 39 | Example 40 | Example 41 | Comparative Example 7 | Comparative Example 8 | Comparative Example 9 |
|---|---|---|---|---|---|---|---|
| Positively charged coating layer | Forming method | Coating | Coating | Coating | — | Coating | Coating |
| | Thickness (nm) | 30 | 30 | 30 | — | 30 | 30 |
| | Thickness in comparison to average diameter of nanofibers (%) | 12 | 12 | 12 | — | 12 | 12 |
| | Weight ratio between positively charged compound and binder | 1:0.2 | 1:0.2 | 1:0.2 | — | 1:0.2 | 1:0.2 |
| Hydrophilic coating layer | Thickness (nm) | 20 | 45 | 62.5 | — | 30 | 30 |
| | Thickness in comparison to average diameter of nanofibers (%) | 8 | 18 | 25 | — | 12 | 12 |
| Nanofiber web | Average pore diameter (μm) | 0.36 | 0.24 | 0.15 | 0.3 | 0.3 | 0.3 |
| | Porosity (%) | 51 | 43 | 39 | 45 | 45 | 45 |
| Whether first support is included | | ○ | ○ | ○ | ○ | ○ | X |
| Whether second support is included | | ○ | ○ | ○ | ○ | X | ○ |
| Relative water permeability (%) | | 88 | 98 | 79 | 100 | 117 | 110 |
| Zeta potential | | 24 | 23 | 23 | — | 24 | 24 |
| Negative ion filtration efficiency (%) | | 94 | 95 | 95 | 12 | 88 | 89 |
| Durability against backwashing | | ○ | ○ | ○ | ○ | X | X |
| Negative ion filtration efficiency after backwashing (%) | | 92 | 95 | 95 | 12 | 65 | 49 |

As seen in Tables 7 to 9, Examples 27 to 29, 31, 32, 35, 36, 39, and 40, which satisfied a forming method and a thickness of a positively charged coating layer, a weight ratio between a positively charged compound and a binder, a thickness of a hydrophilic coating layer, an average pore diameter and porosity of a nanofiber web, a first support, a second support, and whether the positively charged coating layer was included, and the like, were excellent in all of water permeability, filtration efficiency, durability against backwashing, and filtration efficiency after the backwashing at the same time in comparison to Examples 30, 33, 34, 37, 38, and 41 and Comparative Examples 7 to 9, in which even any one of such factors was omitted.

Although one embodiment of the present invention has been described above, the concept of the present invention is not limited to the embodiment disclosed herein. Another embodiment may be easily perceived by one of ordinary skill in the art by adding, changing, deleting, adding, and the like a component within an equivalent range of the concept and should be included in the scope of the present invention.

The invention claimed is:

1. A filter medium comprising:
a first support having a plurality of pores;
nanofiber webs disposed above and below the first support and comprising nanofibers forming a three-dimensional network structure and a hydrophilic coating layer formed on at least a part of an outer surface of the nanofibers and formed of a hydrophilic coating composition including a hydrophilic polymer compound consisting of polyvinyl alcohol having a degree of polymerization of 1,500 to 1,800 and a degree of saponification of 86 to 89%, a crosslinking agent, and a wettability enhancer, wherein the wettability enhancer is incorporated into the hydrophilic coating layer to improve penetrability of the hydrophilic coating layer into the nanofiber webs; and
second supports interposed between the first support and the nanofiber webs and having a plurality of pores;
wherein the hydrophilic coating composition comprises 90 to 140 parts by weight of the crosslinking agent with respect to 100 parts by weight of the hydrophilic polymer compound,
wherein the hydrophilic coating composition comprises 5,000 to 15,000 parts by weight of the wettability enhancer with respect to 100 parts by weight of the hydrophilic polymer compound, and
wherein the crosslinking agent comprises sulfosuccinic acid and poly(styrene sulfonic acid-maleic acid) at a weight ratio of 1:5 to 1:8.

2. The filter medium of claim 1, wherein the hydrophilic coating layer is formed by crosslinking the hydrophilic polymer compound using the crosslinking agent.

3. The filter medium of claim 1, wherein the wettability enhancer is isopropyl alcohol, and wherein the wettability enhancer prevents contraction of the nanofiber webs due to vaporization of the wettability enhancer.

4. The filter medium of claim 1, wherein the hydrophilic coating layer has a thickness of 5 to 20% in comparison to an average diameter of the nanofibers.

5. The filter medium of claim 1, wherein the nanofiber web has an average pore diameter of 0.1 to 3 μm and a porosity of 40 to 90%.

6. The filter medium of claim 1, wherein the nanofibers have an average diameter of 50 to 450 nm.

7. The filter medium of claim 1, wherein the first support and the second support are any one of a non-woven fabric, a woven fabric, and a knitted fabric.

8. The filter medium of claim 1, wherein the first support comprises a first composite fiber which comprises a support component and a low melting point component and is disposed to expose at least a part of the low melting point component on an outer surface, and the first support and the second support are bonded through fusion between the low melting point component of the first composite fiber and a low melting point component of a second composite fiber.

9. The filter medium of claim 1, wherein the first support has a thickness of 90% or more of a thickness of an entirety of the filter medium and has a basis weight of 250 to 800 g/m².

10. The filter medium of claim 1, wherein the second support comprises a second composite fiber which comprises a support component and a low melting point component and is disposed to expose at least a part of the low melting point component on an outer surface, and the low melting point component of the second composite fiber is fused onto the nanofiber web.

11. The filter medium of claim 1, wherein the second support has a basis weight of 35 to 80 g/m² and a thickness of 150 to 250 μm.

12. A method of manufacturing a filter medium according to claim 1, comprising:
(1) forming a fiber web using nanofibers formed by electrospinning a spinning solution;
(2) manufacturing lamination by laminating the fiber web with a second support;
(3) forming a hydrophilic coating layer using a hydrophilic coating composition including a hydrophilic polymer compound including one or more types of functional groups selected from a hydroxyl group and a carboxyl group on at least a part of an outer surface of the nanofibers of the fiber web included in the lamination and a crosslinking agent including at least one sulfonic group; and
(4) disposing and laminating the lamination including the hydrophilic coating layer on each of both sides of a first support such that the second support comes into contact with the first support.

13. The method of claim 12, wherein the operation (3) comprises:
(3-1) forming the hydrophilic coating layer on the lamination by treating the hydrophilic coating composition; and
(3-2) removing the hydrophilic coating layer formed on the second support by cleaning the lamination on which the hydrophilic coating layer is formed.

14. A flat filter unit comprising:
the filter medium according to claim 1; and
a support frame including a flow path, through which a filtrate filtered by the filter medium is discharged to the outside, and supporting an edge of the filter medium.

* * * * *